US012684321B2

(12) United States Patent
Purkayastha et al.

(10) Patent No.: US 12,684,321 B2
(45) Date of Patent: Jul. 14, 2026

(54) MULTI-ACCESS EDGE COMPUTING

(71) Applicant: InterDigital Patent Holdings, Inc., Wilmington, DE (US)

(72) Inventors: Debashish Purkayastha, Collegeville, PA (US); Shalini Choudhury, Highland Park, NJ (US); Robert Gazda, Spring City, PA (US); Alain Mourad, Ascot (GB); Carlos Jesus Bernardos, Madrid (ES); Antonio de la Oliva, Madrid (ES)

(73) Assignee: InterDigital Patent Holdings, Inc., Wilmington, DE (US)

( * ) Notice: Subject to any disclaimer, the term of this patent is extended or adjusted under 35 U.S.C. 154(b) by 270 days.

(21) Appl. No.: 18/561,552

(22) PCT Filed: May 17, 2022

(86) PCT No.: PCT/US2022/029592
§ 371 (c)(1),
(2) Date: Nov. 16, 2023

(87) PCT Pub. No.: WO2022/245796
PCT Pub. Date: Nov. 24, 2022

(65) Prior Publication Data
US 2024/0259772 A1 Aug. 1, 2024

Related U.S. Application Data

(60) Provisional application No. 63/189,425, filed on May 17, 2021.

(51) Int. Cl.
*H04W 4/50* (2018.01)
*G06F 9/54* (2006.01)

(52) U.S. Cl.
CPC .............. *H04W 4/50* (2018.02); *G06F 9/546* (2013.01)

(58) Field of Classification Search
CPC .......... H04W 4/50; G06F 9/546; H04L 67/51
(Continued)

(56) References Cited

U.S. PATENT DOCUMENTS

2018/0183855 A1 6/2018 Sabella et al.
2019/0166476 A1* 5/2019 Seed ........................ H04W 4/70
(Continued)

FOREIGN PATENT DOCUMENTS

WO 2021/062256 A1 4/2021

OTHER PUBLICATIONS

Written Opinion of the International Searching Authority (ISA) dated May 17, 2022 (Year: 2022).*
(Continued)

*Primary Examiner* — Juan A Torres
(74) *Attorney, Agent, or Firm* — Condo Roccia Koptiw LLP

(57) ABSTRACT

Systems, methods, and instrumentalities are provided for enabling a wireless transmit/receive unit (WTRU) to participate in multi-access edge computing (MEC) services. The WTRU may be a constrained WTRU, for example, in terms of computation, storage, and/or networking resources available to the WTRU. A function may be implemented on the WTRU to expose an interface to a MEC application on the WTRU, through which the MEC application may register with a network device such as an MEC host located at the edge of a mobile communication network and join an MEC service provided by the MEC host. A transport may be established between the WTRU and the MEC host to facilitate provision of the MEC service, and the transport may be
(Continued)

modified and/or deleted, for example, based on mobility events at the WTRU and/or load conditions of the WTRU.

20 Claims, 25 Drawing Sheets

(58) Field of Classification Search
USPC ...................................... 455/418, 403, 550.1
See application file for complete search history.

(56)                    References Cited

U.S. PATENT DOCUMENTS

| | | | |
|---|---|---|---|
| 2020/0259922 A1* | 8/2020 | Shim | H04L 63/0876 |
| 2020/0302431 A1* | 9/2020 | Polehn | H04L 9/3213 |
| 2021/0027415 A1* | 1/2021 | Khalid | G06N 20/00 |
| 2021/0243232 A1* | 8/2021 | Verma | H04L 63/205 |
| 2021/0258231 A1* | 8/2021 | Venkataramu | H04L 41/40 |
| 2022/0014595 A1* | 1/2022 | Lee | H04L 67/561 |
| 2022/0322379 A1* | 10/2022 | Macias | H04W 76/10 |
| 2022/0329649 A1* | 10/2022 | Feng | H04L 67/51 |
| 2023/0134708 A1* | 5/2023 | Feng | H04L 67/1014 |
| | | | 709/203 |

OTHER PUBLICATIONS

European Telecommunications Standards Institute (ETSI), GR MEC 036 V3.0.3, "Multi-Access Edge Computing (MEC), Study on MEC in Resource Constrained Terminals, Fixed or Mobile", Oct. 2010, pp. 1-17.
European Telecommunications Standards Institute (ETSI), GS MEC 003 V2.1.1, "Multi-access Edge Computing (MEC), Framework and Reference Architecture", Jan. 2019, pp. 1-21.
European Telecommunications Standards Institute (ETSI), GS MEC 016 V2.2.1, "Multi-access Edge Computing (MEC), Device Application Interface", Apr. 2020, pp. 1-28.
Kekki et al., "MEC in 5G Networks", ETSI White Paper No. 28, First edition, Jun. 2018, pp. 1-28.

\* cited by examiner

MULTI-ACCESS EDGE COMPUTING

CROSS-REFERENCE TO RELATED APPLICATIONS

This application is the National Stage Entry under 35 U.S.C. § 371 of Patent Cooperation Treaty Application No. PCT/US2022/029592, filed May 17, 2022, which claims the benefit of U.S. provisional patent application No. 63/189,425, filed May 17, 2021, the disclosure of which is hereby incorporated by reference in its entirety.

BACKGROUND

Mobile communication technology continues to evolve. A fifth generation may be referred to as 5G or New Radio (NR). A previous (e.g., legacy) generation of mobile communication technology may be, for example, fourth generation (4G) long term evolution (LTE). Multi-access edge computing (MEC) (e.g., also referred to as mobile edge computing) may be deployed in a communication network to provide services (e.g., cloud-based services) to mobile users, and infrastructure may be needed to facilitate those services.

SUMMARY

Systems, methods, and instrumentalities are described herein for enabling constrained wireless transmit/receive units (WTRUs) to participate in MEC services. A WTRU as described herein may comprise a processor that may be configured to receive a request from an application on the WTRU to join an MEC service and send a message to a network device associated with the MEC service indicating the request to join the MEC service. The processor may be further configured to receive an acknowledgment from the network device in response to sending the message, wherein the acknowledgment may include an identifier (e.g., a transport identifier) to be used by the application for the MEC service. The processor may send the identifier to the application on the WTRU.

The network device may be an edge server (e.g., located at the edge of a mobile communication network) configured to support the MEC service, and the request may be received from the application on the WTRU over an interface (e.g., an Mp1 interface) configured between the application and an MEC function configured to interact with the network device. The processor may be configured to provide an identifier of the interface to the application prior to receiving the request from the application (e.g., such that the application may send the request using the identifier of the interface).

The message sent from the WTRU to the network device may indicate at least one of an identifier of the WTRU, an identifier of the application on the WTRU, or a location of the WTRU. The acknowledgment received from the network device may include an uniform resource identifier (URI) associated with the MEC service and, upon receiving the acknowledgment, the processor of the WTRU may be further configured to associate the URI with the application on the WTRU. The processor may receive an application programming interface (API) call from the application on the WTRU and may send the API call to the network device based on the URI.

In examples, the WTRU described herein may be further configured to receive a de-registration request from the application to stop participating in the MEC service and the WTRU may indicate the de-registration request to the network device. The WTRU may also be configured to send a modification request regarding the MEC service to the network device based on a mobility event at the WTRU or a load condition of the WTRU.

DETAILED DESCRIPTION

Figure 1A:
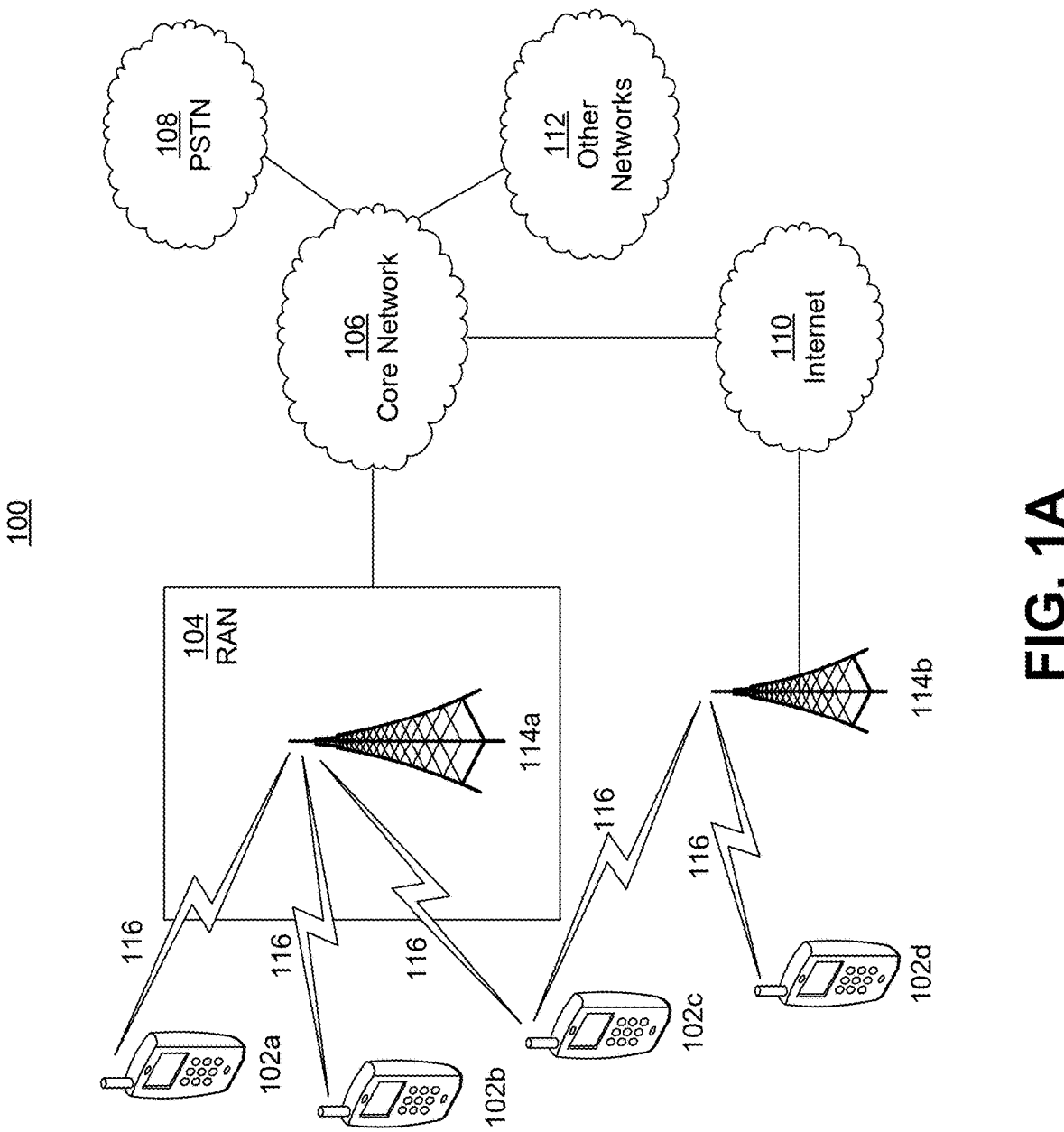
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations

114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be requested to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) parameters and/or requests, such as differing throughput parameters, latency parameters, error tolerance parameters, reliability parameters, data throughput parameters, mobility parameters, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
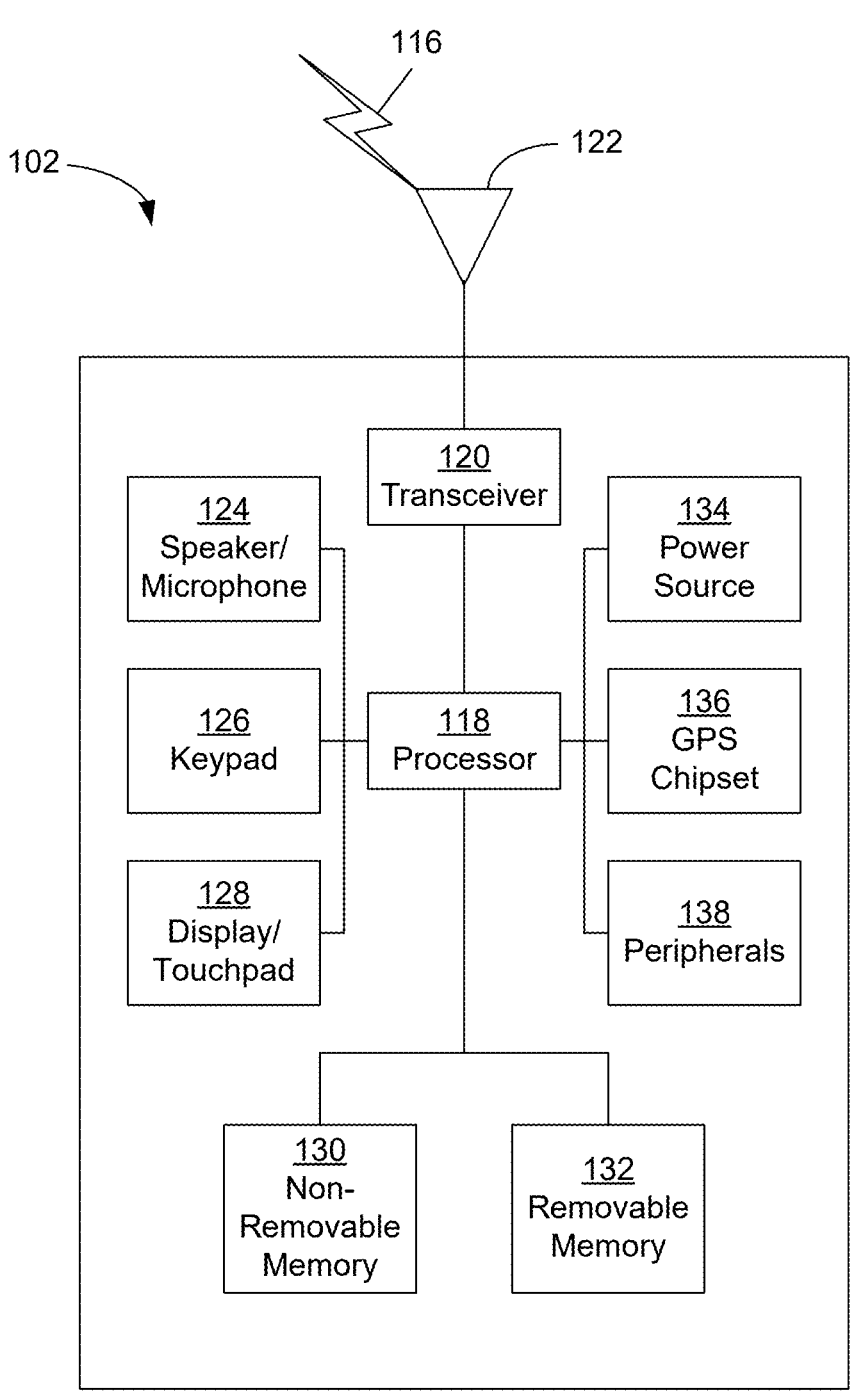
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128

(e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
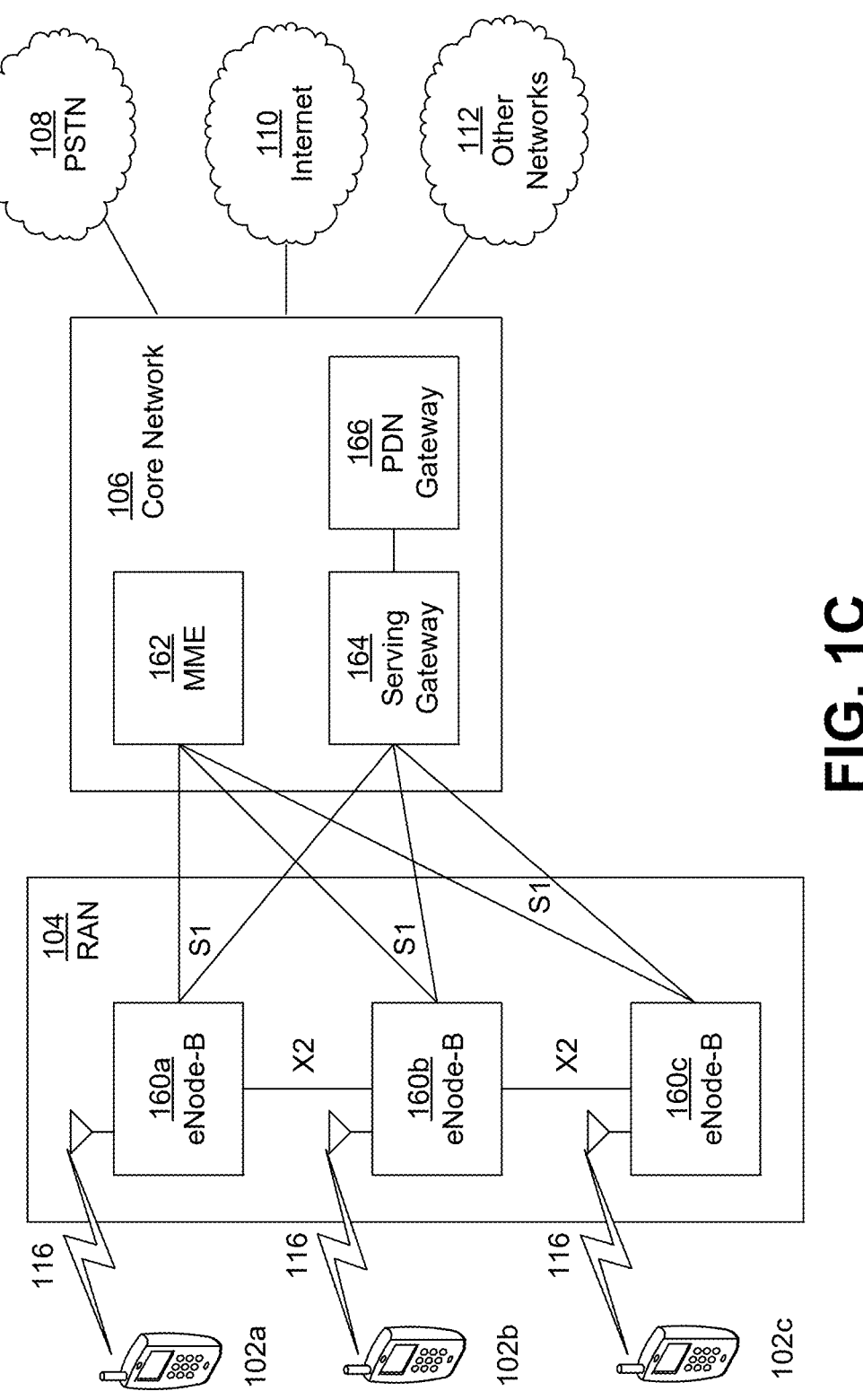
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11 ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
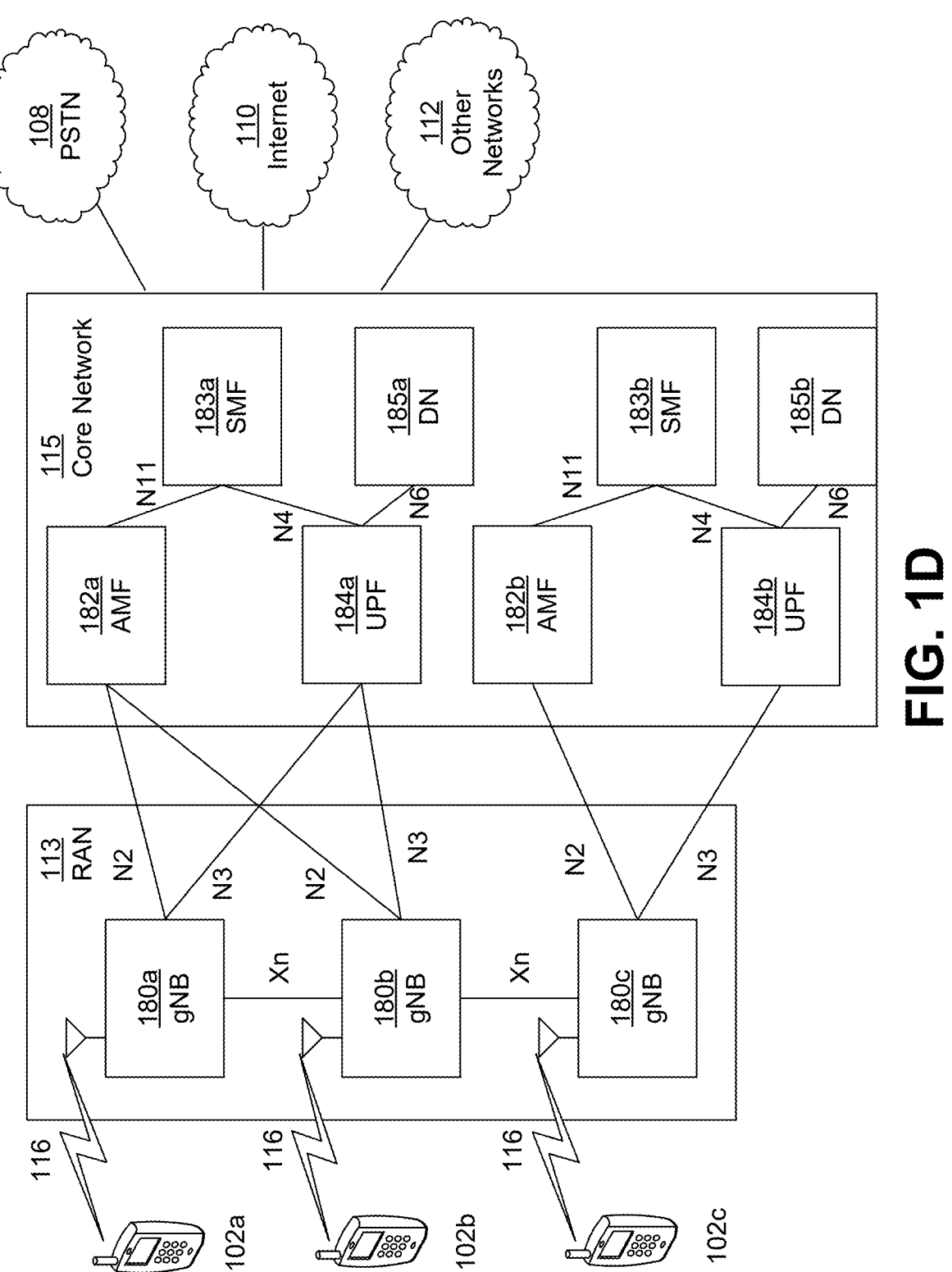
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different parameters), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of WTRU 102*a*-*d*, Base Station 114*a*-*b*, eNode-B 160*a*-*c*, MME 162, SGW 164, PGW 166, gNB 180*a*-*c*, AMF 182*a*-*b*, UPF 184*a*-*b*, SMF 183*a*-*b*, DN 185*a*-*b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Multi-access edge computing (MEC) (e.g., which may also be referred to herein as mobile edge computing) may be deployed in a communication network (e.g., at the edge of a mobile communication network) to provide services to mobile users. An open environment may be specified, for example, for integrating MEC capabilities with a service provider's network (e.g., including applications from 3rd parties). Such an environment (e.g., with distributed computing capabilities) may make cloud computing available for deployment of functions in a mobile access network.

Figure 2:
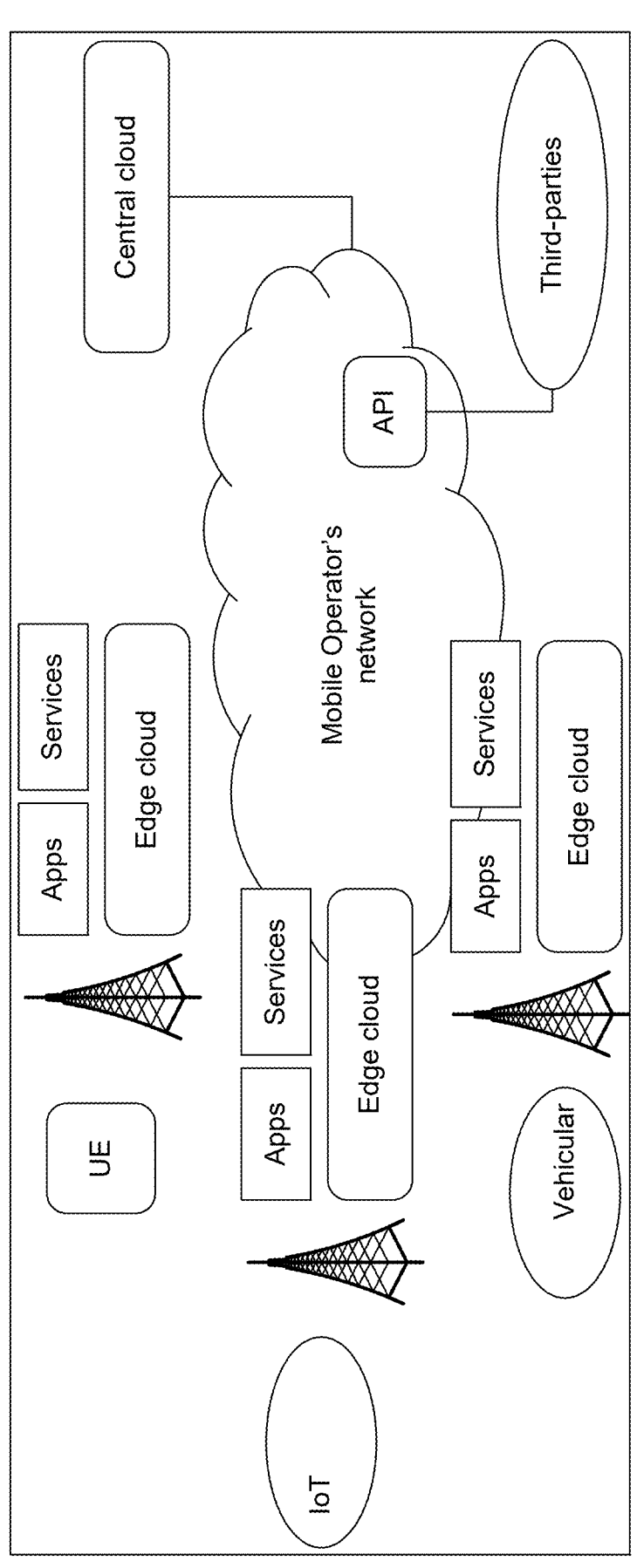
FIG. 2 is a diagram illustrating an example multi-access edge computing (MEC) architecture.
Figure 3:
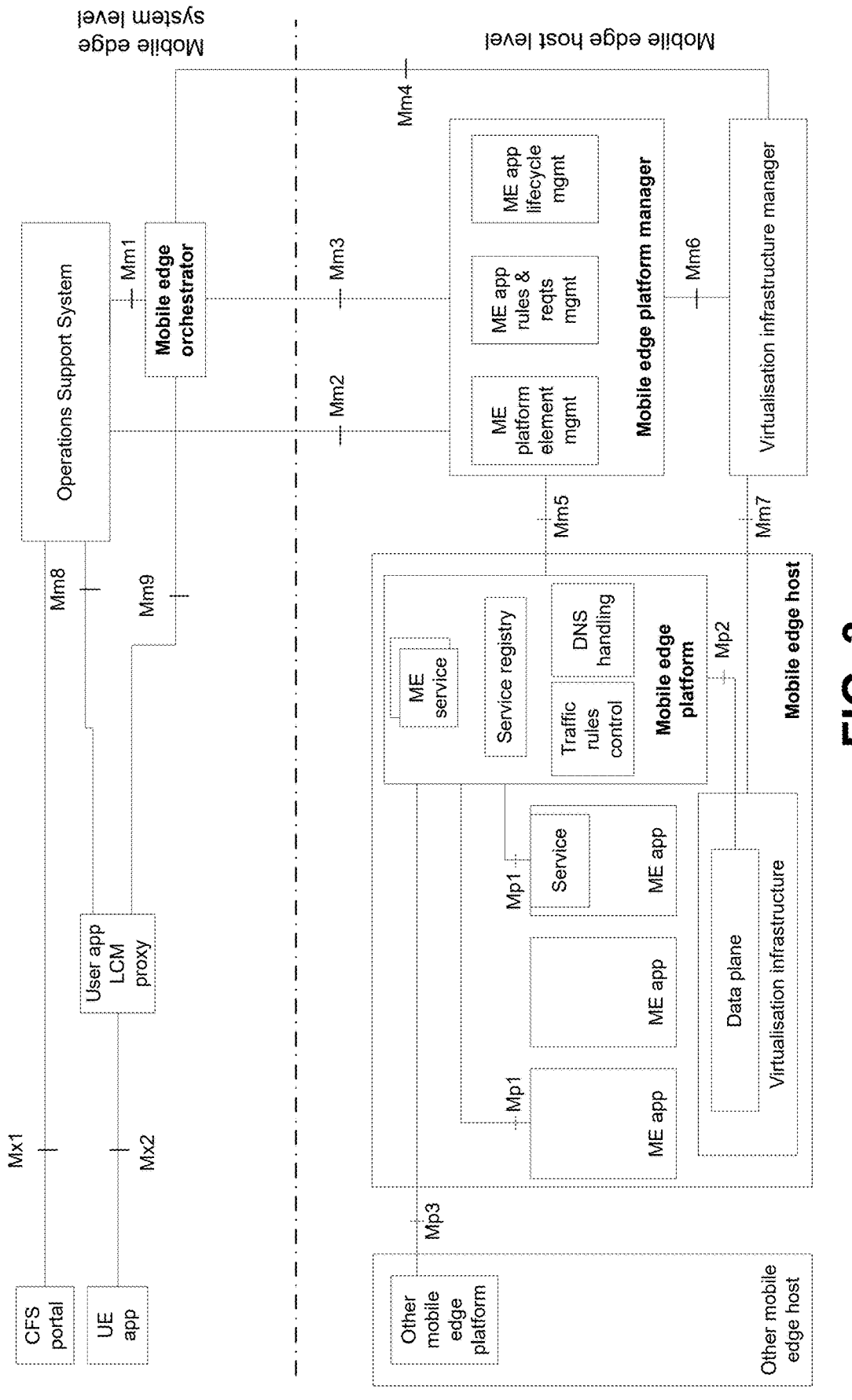
FIG. 3 is a diagram illustrating another example MEC architecture.

FIG. 2 and FIG. 3 illustrate example MEC architectures that may include, for example, one or more mobile edge systems and one or more reference points. For instance, there may be three groups of reference points defined between system entities: (i) reference points associated with mobile edge platform functionality (Mp), (ii) management reference points (Mm), and/or (iii) reference points connecting to external entities (Mx). The mobile edge system may include one or more mobile edge hosts and/or a mobile edge manager configured to run mobile edge applications within an operator network or a part of an operator network. The mobile edge host may be an entity that includes a mobile edge platform and/or a virtualization infrastructure, which may provide computing, storage, and/or network resources for mobile edge applications. The mobile edge platform may include a collection of functionalities (e.g., essential functionalities) for running mobile edge applications in a particular virtualization infrastructure and/or for enabling the mobile edge applications to provide and/or receive mobile edge services.

Mobile edge applications may be instantiated on the virtualization infrastructure of a mobile edge host, for example, based on configuration requests that may be validated by a mobile edge manager. The mobile edge manager may provide mobile edge system level management and/or mobile edge host level management. Mobile edge system level management may include a mobile edge orchestrator (e.g., as a core component), which may have an overview of the complete mobile edge system. Mobile edge host level management may comprise a mobile edge platform manager and/or a virtualization infrastructure manager, and may handle the management of mobile edge specific functionalities (e.g., of a particular mobile edge host) and/or the applications running on a mobile edge host.

MEC may be deployed (e.g., enabled) for resource constrained WTRUs (e.g., fixed or mobile devices or terminals), such as those having limited computing, networking, and/or storage capabilities, and/or those with constrained power, mobility, reliability, security features, etc. For example, MEC may be deployed in a resource constrained device. In examples, a resource constrained device may have a constrained resource such as a power constraint (e.g., battery and/or other power source), a processing constraint, a memory constraint, and/or the like. In examples, a resource constrained device may be less secure and/or more vulnerable than another device. In examples, a resourced constrained device may be less dependable (e.g., may unexpectedly lose power, communication ability, processing power, and/or the like).

WTRUs (e.g., terminal units, mobile hosts, and/or personal devices) may be used to support cloud computing at the edge of a network. Inter MEC communication may be provided. MEC specifications may be applied to inter-MEC systems and/or MEC-cloud system coordination including, for example, support for application instance relocation, synchronization, and/or MEC federation. An MEC federation may comprise one or more federation manager modules, which may be responsible for communication among MEC systems and/or for providing a list of functionalities associated with MEC platform discovery. Third parties (e.g., application developers) may provide enablement and/or enhancement of functionalities for application lifecyle management.

As part of the operation of an MEC federation, inter-MEC system communication (e.g., information exchange) may be performed at an MEC platform level or a higher level, for example, after MEC system discovery and/or MEC platform discovery, and/or for MEC service consumption and/or MEC app-to-app communication.

Figure 4:
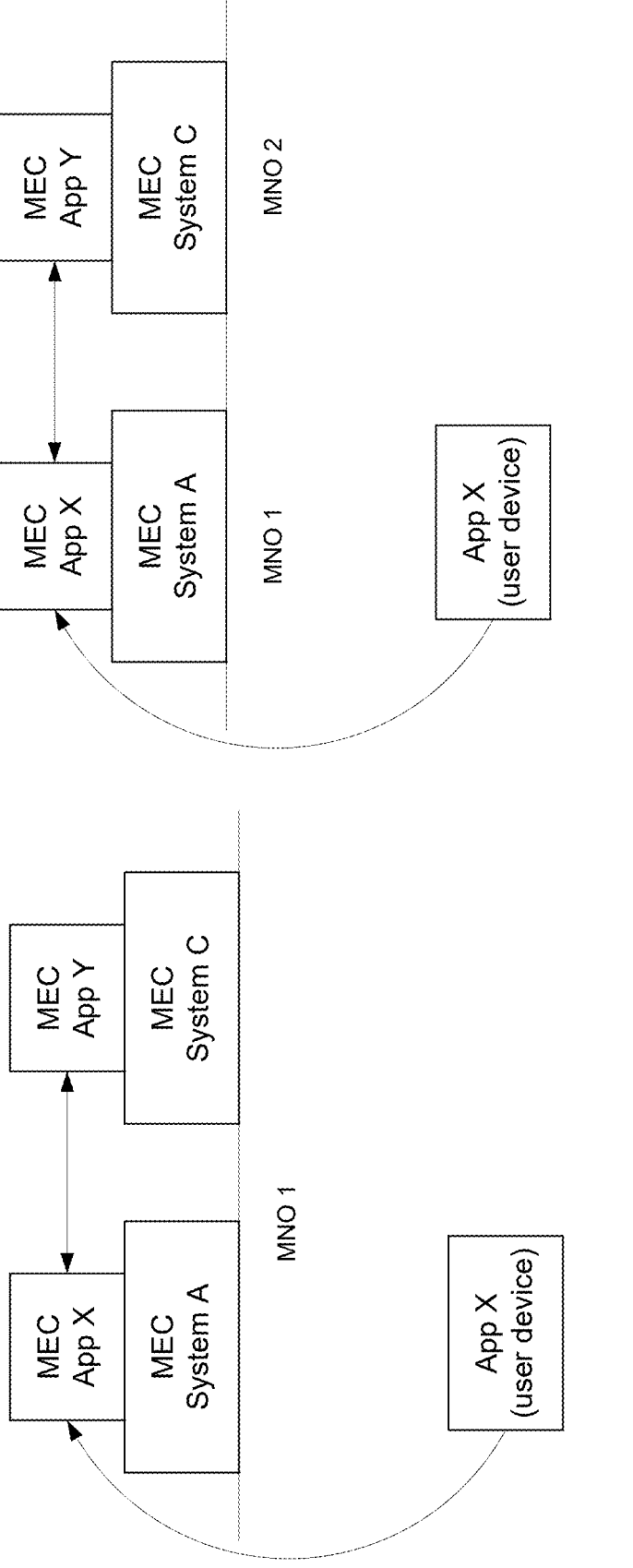
FIG. 4 is a diagram illustrating examples of inter-app communication in one or more multi-MEC environments provided by a single mobile network operator (MNO) and/or multiple MNOs.
Figure 5A:
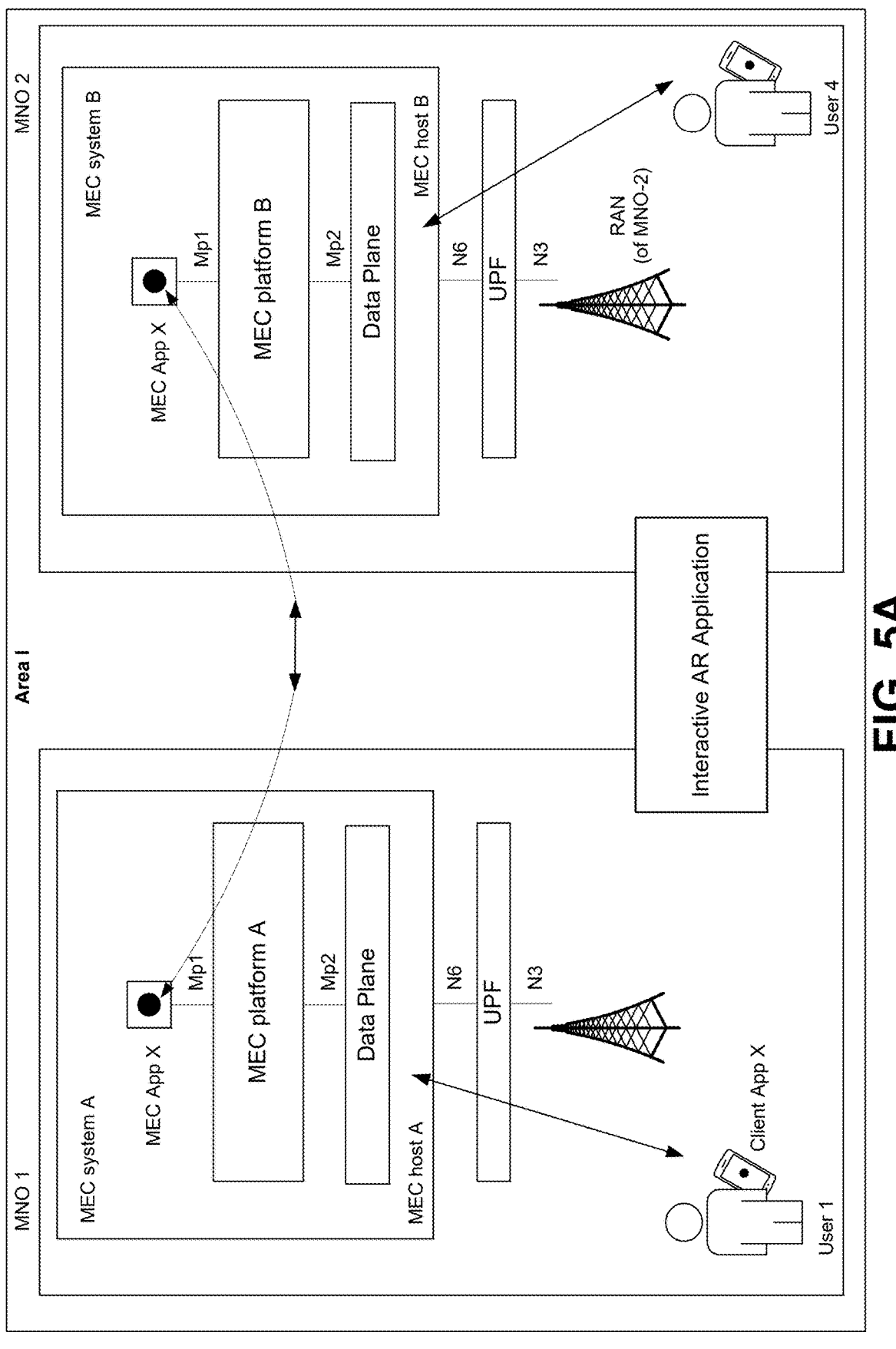
FIG. 5A is a diagram illustrating an example of an interactive augmented reality (AR) application with one or more users connected through one or more MNOs.
Figure 5B:
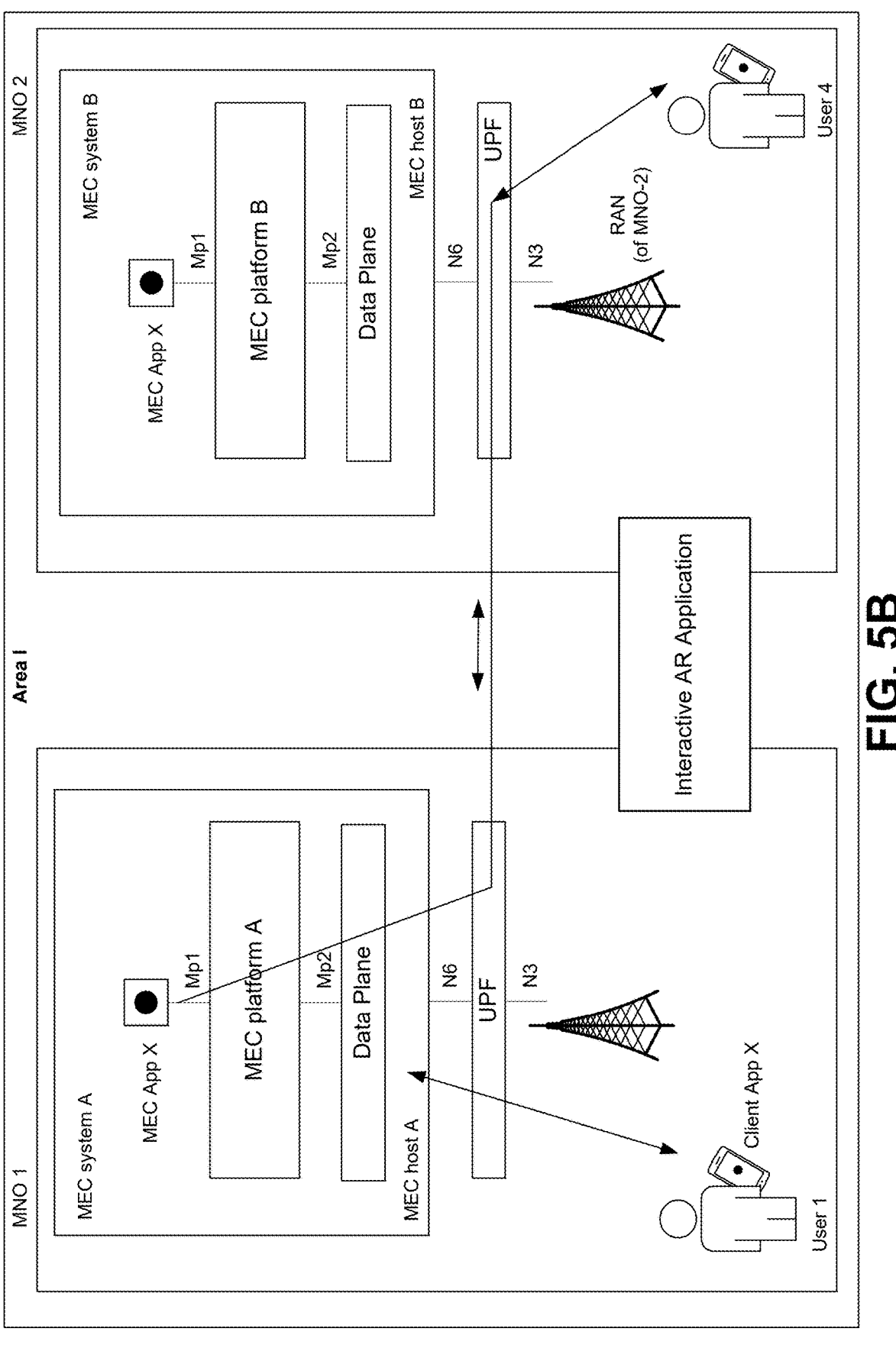
FIG. 5B is a diagram illustrating another example of an interactive AR application with one or more users connected through one or more MNOs.

FIG. 4 illustrates an example of communication between MEC applications (e.g., referred to herein as MEC apps) in an multi-MEC environment operated by a single mobile network operator (MNO) or multiple MNOs. Without an MEC federation, it may be difficult to enable interactive applications (e.g., such as an augmented reality (AR) application) in which users may be connected through different MNOs and thus may not be able to join a multi-player interactive AR game. Such difficulties may be solved, for example, using the techniques (e.g., MEC federation techniques) described herein, such as the techniques illustrated in FIGS. 5A and 5B. FIG. 5A illustrates an example for providing an interactive AR application with one or more users connected to one or more MNOs. FIG. 5B illustrates another example for providing an interactive AR application to one or more users connected to one or more MNOs.

As shown in FIG. 5A, two AR game MEC app instances (e.g., app X shown in the figure) may coordinate for real-time synchronization. Following an MNO agreement, an IP network (e.g., a direct IP network) may be established between associated MEC systems owned and operated by different MNOs. As shown in FIG. 5B, an MEC platform (e.g., MEC system B) may switch traffic from a certain user (e.g., user 4) for MEC app X to another MEC platform (e.g., MEC system A). Following an MNO agreement, an IP network (e.g., a direct IP network) may be established between the user plane functions (UPFs) of different MNOs within an MEC federation.

The example shown in FIG. 5A may align with certain use cases (e.g., zero manufacturing defects in a smart factory, massive multi-player online gaming, etc.). In those examples, MEC app instances (e.g., application X instances) may be available on MEC hosts of MEC system A and/or MEC system B, and these app instances may communicate and/or coordinate with each other, for example, to synchronize the application (e.g., similar to a game scenario or a smart factory manufacturing scenario).

The example shown in FIG. 5A may enable an MEC application instance to discover another MEC application instance (e.g., of the same application) in the same MEC system or in different MEC systems. Subject to agreement among the involved parties (e.g., operators and app providers), the example technique illustrated in FIG. 5A may support the on-boarding and/or instantiation of an MEC application in an MEC system, for example, in response to a request with certain (e.g., key) performance indicators such as a latency indicator by another MEC system.

Using multi-player gaming as an example, the example shown in FIG. 5A may allow the MEC application X instantiated on MEC host A to transfer multiplayer room information to an MEC application X instance (e.g., other MEC application X instances) on other MEC host(s) within an MEC federation (e.g., MEC host B). A user (e.g., user 4) may enjoy the multiplayer game by entering the multiplayer game room when connecting to a game server such as the MEC application X running on MEC host B.

Using the example technique illustrated by FIG. 5B, a main application instance may remain in MEC host A in MNO-1 and user 1 may decide where a multiplayer game room may be created. The main application instance (e.g., MEC application X on MEC host A) may transfer this information to other MEC application X instantiated on the other MEC host(s) of an MEC federation (e.g., to MEC host B). If there is a disruption of connectivity with MEC host A, the players connected via other MNOs (e.g., MNO-2) may be unable to continue with the gaming service. If a player has joined the online game from another MNO and the traffic is continuously steered through the main application instance hosted in MNO-1, traffic may be constantly routed via a home-network, for example, similar to triangular routing. The traffic may be constantly routed via the home-network, for example, if an original application instance is hosted in an MNO far away from the MNO with which the players are currently connected. This approach may cause latency and thus may not be suitable for real-time use cases (e.g., such as multiplayer online gaming or zero manufacturing defect).

Figure 6:
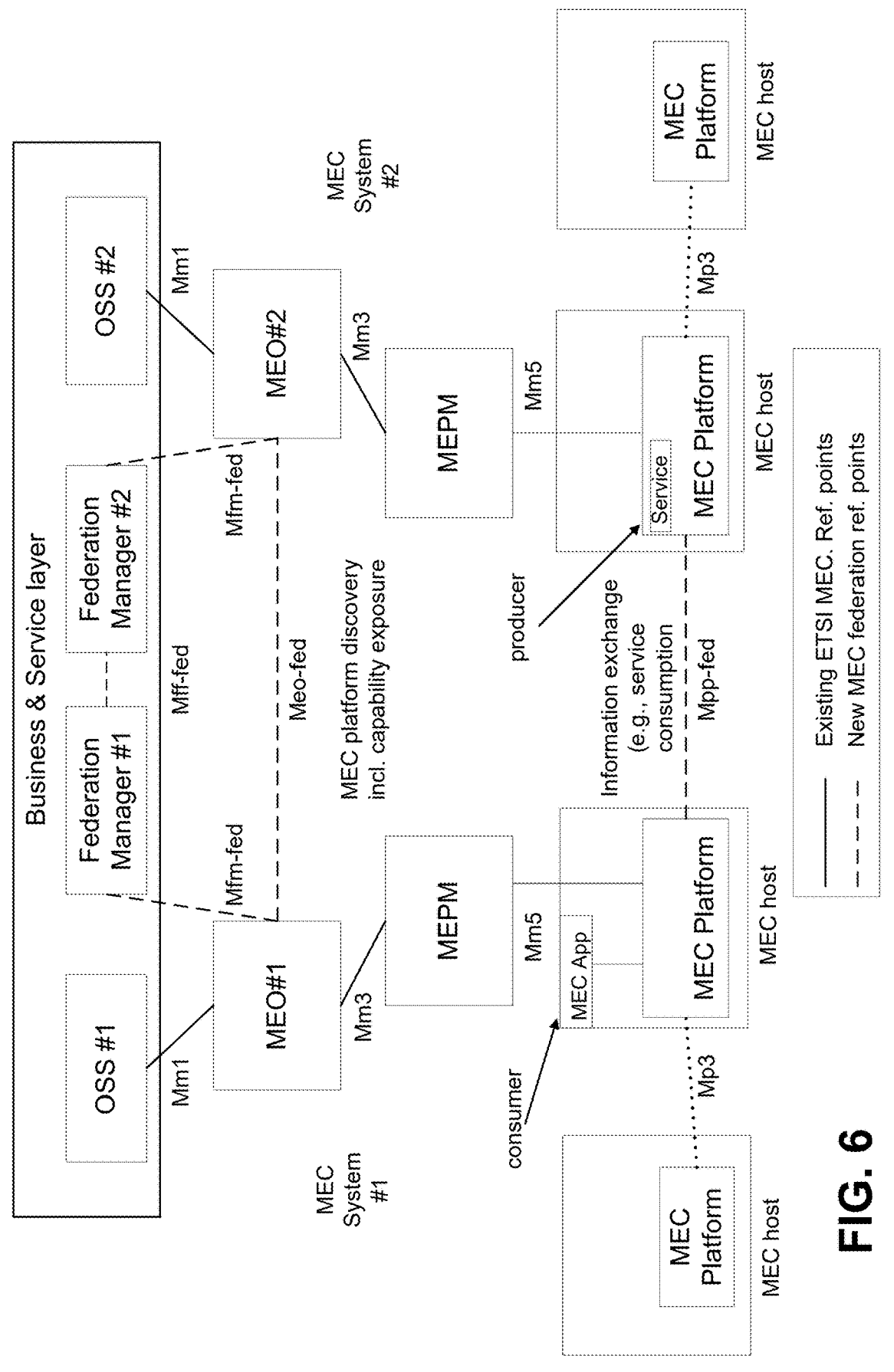
FIG. 6 is a diagram illustrating examples of MEC interfaces or reference points.

FIG. 6 illustrates an example of an MEC federation with one or more MEC reference points. For example, as shown in FIG. 6, multiple federation managers may interact (e.g., directly interact) with each other via a dedicated reference point (e.g., such as an Mff-fed). To facilitate inter-MEC system information exchange associated with MEC service consumption and/or MEC app-to-app communication, the processes for discovering another MEC system and its MEC platforms may be handled by one or more MEC federation entities. Control signals (e.g., all control signals) between the MEC systems (e.g., associated with establishing a MEC federation) may be exchanged, for example, via one or more federation management entities. If a federation manager does not have enough information to identify a requested service, it may send the request to one or more connected MEC orchestrators (MEOs) to identify an appropriate MEC platform.

An Mpp-fed reference point (e.g., connecting inter-system MEC platforms) may allow edge service consumption in MEC federation scenarios. Service consumption may be defined in the context of a MEC federation and/or based on an Mpp-fed reference point (e.g., a new Mpp-fed reference point). An Mp3 reference point may be enhanced with the capabilities to transmit to and/or receive signals from MEC platforms belonging to different MEC systems.

An Meo-fed reference point may be used to connect multiple configured MEOs. The Meo-fed reference point may enable inter-MEC system platform discovery including, for example, capability exposure. After MEC system discovery, MEO #1 may know the ID of MEO #2 and/or may communicate with MEO #2 via the Meo-fed reference point (e.g., requesting the IDs of available MEC platforms of MEC system #2, a list of shared services, authorization and access policies, etc.).

The signaling (e.g., messages) among different MEC systems (e.g., owned by different MNOs) may address one or more of the following. The systems may establish a security trust, for example, by authenticating and authorizing each other. An application provider may deploy its application across multiple MEC systems using a single MNO relationship and integration scheme (e.g., a same northbound interface). An MEC application may communicate with other MEC applications (e.g., service-producing MEC applications).

Figure 7:
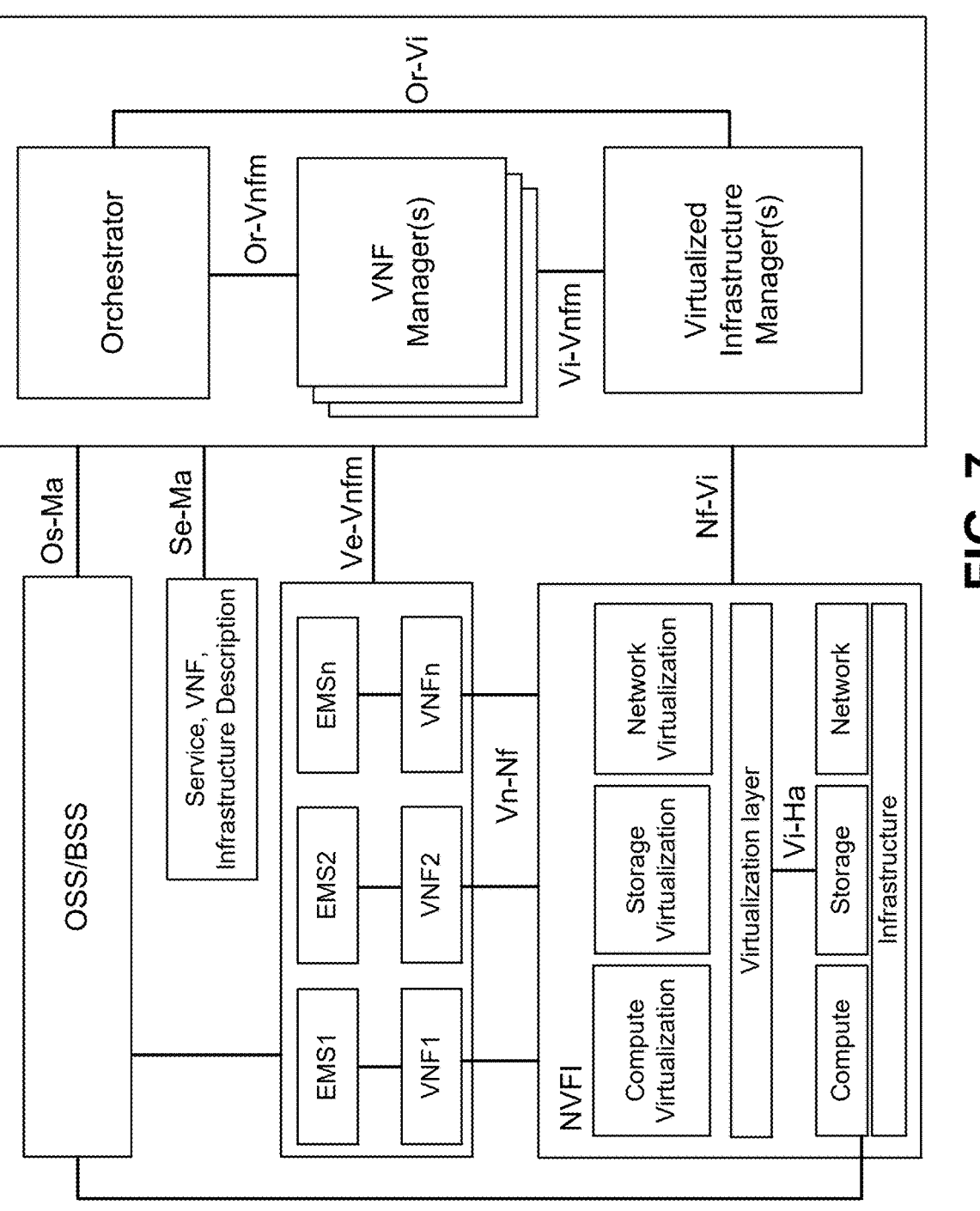
FIG. 7 is a diagram illustrating an example network functional virtualization (NFV) architecture with one or more interfaces.
Figure 8:
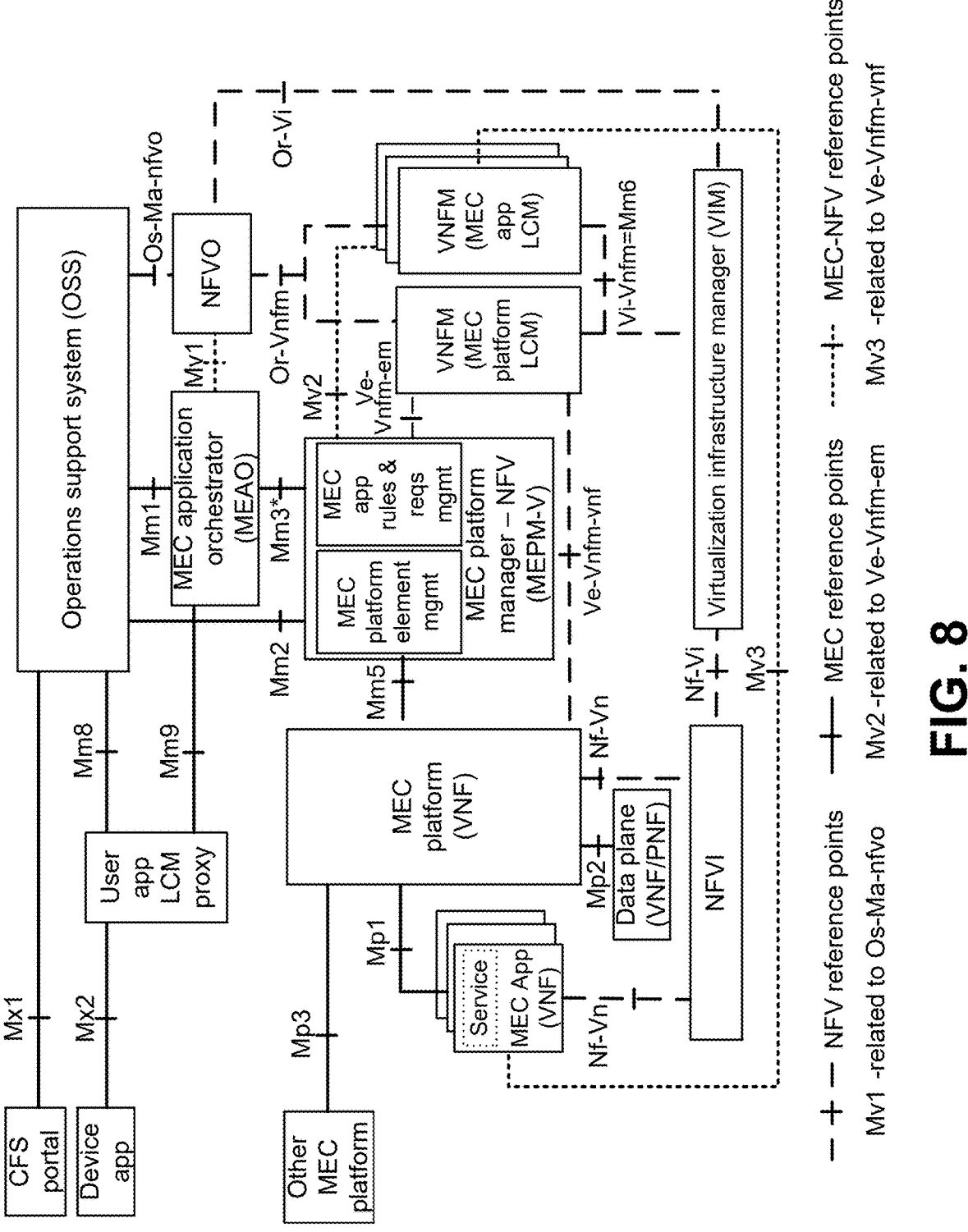
FIG. 8 is a diagram illustrating an example virtual network function (VNF) and its operations.

Network functions virtualization (NFV) interfaces may be provided in an MEC system. NFV may use virtualization technology to realize or facilitate network node functions (e.g., all network node functions) and/or to connect the network node functions. FIG. 7 illustrates an example NFV architecture with one or more interfaces. These NFV interfaces may include Nf-Vn, Nf-Vi, Or-Vnfm, Ve-Vnfm-em, and/or Ve-Vnfm-vnf, although other names may also be used to describe these interfaces without affecting their functionalities. An Nf-Vn interface may connect an multi-access edge (ME) app virtual network function (VNF) (e.g., each MEC app VNF) with the NFV infrastructure (NFVI). An Nf-Vi interface may be used to perform orchestration and management of the NFVI, for example, at a request from a virtualized infrastructure manager (VIM). Such an interface (or reference point) may be used to assign or allocate virtualized resources in response to a resource allocation request, to forward or exchange state information, and/or to request services (e.g., hypervisor services). A VIM or a management and orchestration (MANO) function may interact with the NFVI through one or more of the interfaces described herein. Hypervisors may refrain from implementing services autonomously, for example, unless within the context of a VIM applied policy. An Or-Vnfm interface may be used to connect an NFV orchestrator (NFVO) and a VNF manager (VNFM). In examples, the Or-Vnfm may be primarily used by the NFVO to invoke VNF life cycle management operations. In examples, the Or-Vnfm may be used for resource management, fault management, configuration management, etc., for example, for the VNFs. A Ve-Vnfm-em interface or reference point may interact with a VNFM, for example, on behalf of a mobile edge platform manager VNF-element manager (MEPMV-EM). An MEPMV-EM may interact with a mobile edge platform (MEP) and/or a VNF using a Ve-Vnfm-em interface. Parameters and/or requests for the Ve-Vnfm-em reference point may include a VNF performance management interface, a VNF fault management interface, and/or a VNF indicator interface produced by an EM. The Ve-Vnfm-vnf reference point may support VNF lifecycle management (e.g., such as start and/or stop of the VNF) and/or a VNF configuration interface (e.g., for configuration of the VNF and for the VNFM to determine whether a VNF configuration has been completed).

MEC may be provided and/or deployed using NFV. VNFs associated with an MEC app may be managed like individual VNFs, for example, by allowing a deployment (e.g., an "MECinNFV" deployment) to delegate certain orchestration and life cycle management (LCM) tasks to an NFVO and/or VNFM functional blocks.

A mobile edge platform manager (MEPM) may be transformed into a mobile edge platform manager-NFV (MEPM-V). The MEPM-V may delegate an LCM function to one or more VNFMs. A mobile edge orchestrator (MEO) may be transformed into a mobile edge application orchestrator (MEAO). The MEAO may use an NFVO for resource orchestration, and/or for orchestration of a set of MEC app VNFs as one or more NFV network services (NSs).

Reference points may be introduced between elements of an MEC architecture and an NFV architecture to support the management of MEC app VNFs. These reference points may correspond to or be related to NFV reference points (e.g., existing NFV reference points). A subset (e.g., only a subset) of the functionality of these reference points may be used for MEC, and extensions may be provided. For example, an Mv1 reference point may connect an MEAO with an NFVO, and the Mv1 reference point may be related to an Os-Ma-nfvo reference point. An Mv2 reference point may connect a VNF manager configured to perform the LCM of an MEC app VNF with an MEPM-V, for example, to allow LCM related notifications to be exchanged between these entities. The Mv2 reference point may be related to a Ve-Vnfm-em reference point. The Mv2 reference point may include additions and may refrain from using functionalities (e.g., all functionalities) offered by a Ve-Vnfm-em. An Mv3 reference point may connect a VNF manager with an MEC app VNF instance, for example, to allow the exchange of messages (e.g., related to MEC application LCM or initial deployment-specific configuration). The Mv3 reference point may be related to a Ve-Vnfm-vnf reference point. The Mv3 reference point may include additions, and may refrain from using functionalities (e.g., all functionalities) offered by a Ve-Vnfm-vnf.

One or more WTRUs (e.g., terminal units, mobile hosts, and/or personal devices) may be used to support cloud computing, for example, at the edge of a network. One or more of the following constraints may be considered in order to support MEC or cloud computing. For example, resources (e.g., computation resources) may be constrained for running MEC applications, which may impact the life cycle management of VMs, containers, and/or other form of virtual instances. For example, the mobility of constrained WTRUs may constrain the reachability of MEC applications, the maintenance of reasonable connectivity, the availability of devices, and/or the discovery of services. The lack of reliable high bandwidth backhaul connectivity (e.g., wired or wireless) may impact the performance and/or feasibility of MEC applications. Security, authorization, and/or data privacy may need to be addressed. Constrained WTRUs may also be constrained by power availability, which may affect how much computation the WTRUs may support over a time period.

MEC specifications may be adapted to support cloud computing despite the constraints described herein. Enabling MEC applications and/or services for a WTRU with constrained or reduced capabilities (e.g., in terms of computation power, mobility, connectivity, etc.) may be advantageous. A WTRU with constrained or reduced capabilities but desires to participate in an MEC application or service may be referred to herein as a constrained MEC (CMEC) WTRU.

The deployment scenarios for CMEC WTRUs (e.g., devices) may include, but may not be limited to, one or more of the following: (i) vehicular scenarios, e.g., where a CMEC WTRU embedded in a vehicle may run applications for other neighboring vehicles (e.g., in platooning situations) or for an edge network (e.g., for safety and traffic efficiency applications); (ii) industry 4.0 scenarios, e.g., where mobile robots or robotic arms may host MEC applications (e.g., to minimize the latency requested by certain use cases); or (iii) home gaming scenarios, e.g., where cloud-based gaming applications using AR/VR may demand ultra-low latency and/or extended computational capabilities that may be provided by CMEC WTRUs in the same household or same home network.

In one or more of the deployment scenarios described herein, it may be beneficial to allow CMEC WTRUs (e.g., devices) to offer cloud services dynamically (e.g., as and when requested) so that they may become part of a larger edge computing infrastructure (e.g., a Telco edge). The CMEC WTRUs may also be allowed to inter-operate and/or share computing capabilities with a Telco edge (e.g., an edge network operated by a telecommunication service provider).

The CMEC WTRUs described herein may be supplied by a third party, for example, purchased by a service provider who wants to integrate with an MNO infrastructure. For example, an in-vehicle CMEC WTRU may be installed and/or managed by a vehicle manufacturer. The in-vehicle CMEC WTRU may join an MNO's edge computing infrastructure to provide autonomous vehicle services.

CMEC WTRUs may not be equipped with an MEC platform (e.g., a full MEC platform) and may be equipped with a virtualization environment to support MEC application deployment. In the absence of a MEC platform, the CMEC WTRUs may not support MEC platform features and/or interfaces. These CMEC WTRUs may be managed using a management technology such as Docker, Kubernetes, OpenStack, or a combination thereof. Device edge services may be provided using CMEC WTRUs and in accordance with an NFV architecture (e.g., using any of the management technology described herein).

An MNO edge infrastructure may be capable of integrating (e.g., dynamically) multiple CMEC WTRUs (e.g., CMEC devices). A CMEC WTRU may inter-operate with an MEC platform (e.g., full capability MEC platform) located at a Telco edge (e.g., a network entity such as a base station, an edge server, etc.). When used herein, a Telco edge may include a cloud service provided by network operators at the edge of a network (e.g., at a base station such as an eNB or gNB, at an edge server, at an MEC server, etc.). A CMEC WTRU such as a general purpose CMEC WTRU may be integrated (e.g., dynamically integrated) into an MNO cloud infrastructure. A Telco edge platform (e.g., an MEC platform or interface) may be provided and/or enabled to discover applications on a CMEC WTRU and vice versa. MEC apps at the Telco edge may be allowed to connect with the discovered applications on the CMEC WTRU. The CMEC WTRU's integration with the MEC environment (e.g., with the Telco edge) may be managed under the control of a network operator or a service provider.

At the Telco edge (e.g., which may be located inside a factory floor or at a central location of a facility), an MEC host may be deployed, for example, on a network device or network entity such as an edge server or a base station (e.g., the MEC host may be co-located with a base station and/or an access point (AP)). Such an MEC host may be referred to herein as an EMEC. The EMEC may be deployed with one or more CMEC WTRUs in a hierarchical manner. An association or grouping may be established among the EMEC and the CMEC WTRUs (e.g., for a specific use case or application such as a vehicular application, an Industry 4.0 application, an in-home gaming application, etc.). A (e.g., each) CMEC WTRU may include a virtualization environment capable of deploying or hosting applications in a virtual machine (VM).

A MEC platform may interact with one or more MEC applications via an interface, which may be referred to herein as an Mp1 interface. The Mp1 interface may be used for a variety of purposes including, for example, service registration, service discovery, communication support for services, session state relocation support, etc. The Mp1 interface may be extended, for example, from an MEC app on a CMEC WTRU to an MEC platform on an EMEC (e.g., since the CMEC WTRU itself may not be equipped with an MEC platform). The extension may be enabled, for example, through a function or a proxy (e.g., an Mp1 proxy (Mp1P)) that may be implemented on the EMEC and/or the CMEC WTRU. The function or proxy may be generally referred to herein as an Mp1P, but those skilled in the art will appreciate that the functionality of an Mp1P may not be limited to that of a proxy and a term other than Mp1P may be used to describe the functionality.

The Mp1P may allow MEC apps on a CMEC WTRU to discover other MEC platforms, MEC apps, and/or MEC services running on or supported by a Telco edge and vice versa. The Mp1P may enable inter-CMEC application discovery, e.g., across CMEC WTRUs (e.g., from other CMEC WTRUs). For example, through the Mp1P, a CMEC app may register (e.g., via a registration request) with an EMEC, obtain a transport identifier (ID), and/or perform other MEC operations or procedures (e.g., with additional information such as those illustrated in 7 of FIG. 18). The Mp1P may also allow a transport ID to be deleted (e.g., via a de-registration request) and/or modified (e.g., via a modification request).

As described herein, a CMEC WTRU may not support a full or complete MEC platform and may use virtualization technology to support MEC application deployment. Examples may be described herein as utilizing an NFV reference architecture for system level operations, but it should be noted that the relevant functionalities (e.g., related to an Mp1P) may also be implemented using other cloud reference architectures. Further, standard NFV interface(s) and/or application programming interfaces (APIs) may be used (e.g., to facilitate system level operations). For example, Mp1P specific configuration information may be sent using an NFV interface, and/or a Ve-Vnfm-em interface may be used to transfer information between an MEPMV and a VNFM. Information may be transferred from a VNFM to an MEMPM-V regarding one or more CMEC WTRUs and the information may be used by an EMEC to interact with the CMEC WTRUs. As another example, information may be transferred from an MEMPM-V to a VNFM regarding an EMEC and the information may be used by a CMEC WTRU to interact with the EMEC.

Figure 9:
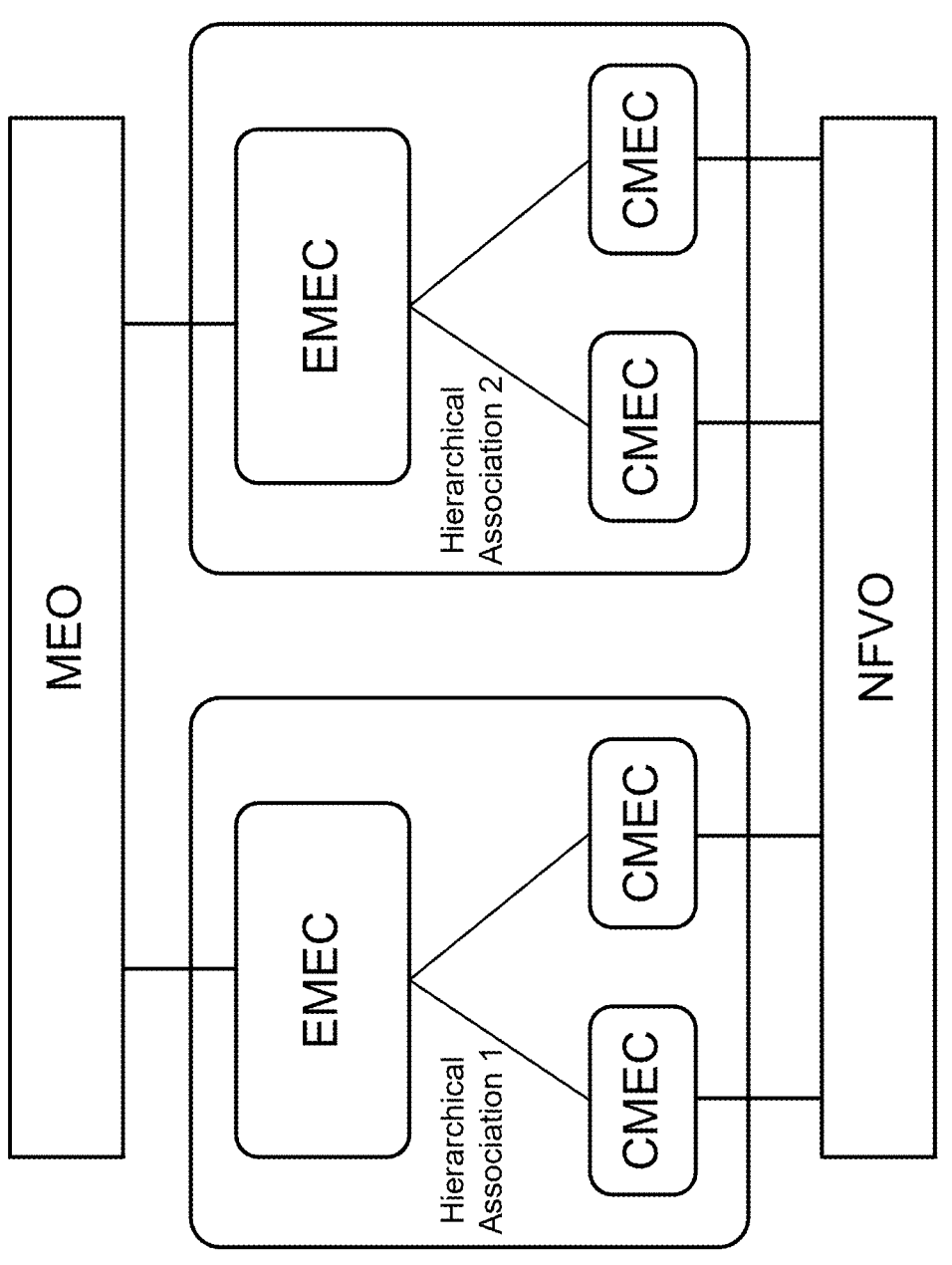
FIG. 9 is a diagram illustrating an example hierarchical architecture for constrained multi-access edge computing (CMEC).

CMEC WTRUs may be deployed in a hierarchical matter, as illustrated by FIG. 9. Machine learning (ML) and/or federated learning (FL) applications may use MEC applications (e.g., running on an EMEC) to consolidate, filter, and/or process application data from other MEC applications (e.g., running on a CMEC WTRU). For example, as part of a surveillance application, images may be captured by a robotic eye. Those images may be processed at the robot, which may include a CMEC WTRU. When the images are processed at the robot, results may be sent to an instance of the surveillance application running on an EMEC. In this scenario, it may be assumed that the surveillance application instance running on the EMEC may play a central role for certain applications running on the CMEC WTRU, and the CMEC WTRU may help with parts of the surveillance application running on the EMEC. A hierarchy may be assumed in such a scenario, wherein the application on the EMEC may be viewed as a central entity communicating with one or more CMEC WTRUs in the vicinity of the EMEC. The hierarchy may lead to deployment of the EMEC and the CMEC WTRU(s) as a group forming an association. The group or association may be established and/or managed by a MEC orchestrator (MEO) and/or a NFV orchestrator (NFVO), as shown in FIG. 9.

Figure 10:
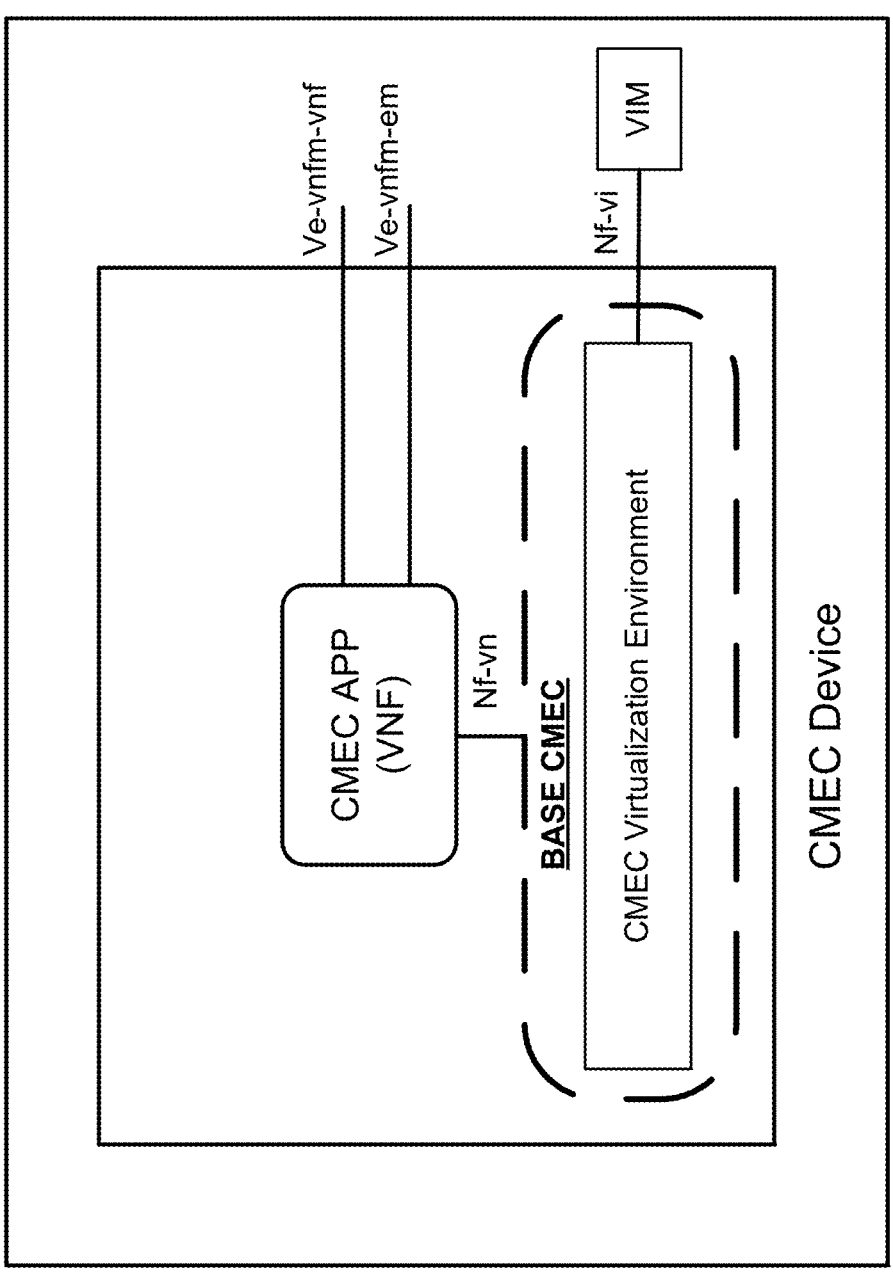
FIG. 10 is a diagram illustrating an example CMEC device.

FIG. 10 illustrates an example of a CMEC WTRU (e.g., a CMEC device). The CMEC WTRU may be equipped with a virtualization platform such as a general purpose virtualization platform (e.g., which may also be referred to as a virtualization environment (VE)) that may provide a common framework for application deployment, execution, and/or management. Multiple CMEC WTRUs may be orchestrated and/or deployed using NFV technology. Using an NFV reference architecture as an example, the virtualization platform or environment may include an NFVI and/or one or more additional functions, although other cloud computing technologies may also be included or utilized. The VE may support an Nf-vn interface for VNF deployment and virtualized resources of the VE may be managed by a virtualized infrastructure manager (VIM). In the example shown in FIG. 10, an CMEC app may be assumed to be a VNF that may support a standard NFV interface.

CMEC APP VNFs may be managed individually (e.g., like individual VNFs) and/or they may delegate orchestration and/or life cycle management (LCM) tasks to an NFVO and/or a VNFM (e.g., via a Ve-vnfm-vnf interface). One or more Ve-vnfm-vnf reference points may support the configuration and/or indicator interface produced by a CMEC APP VNF. An indicator may include information supplied by a CMEC APP VNF, which may indicate behaviors of the VNF. Such an indicator and/or virtualized resource data may contribute to (e.g., assist with) the decision-making (e.g., auto-scaling decisions) of the VNF(s) in a CMEC VE. The fault management (FM) and/or performance measurement (PM) of a CMEC VNF may be handled through a Ve-vnfm-em reference point. A virtual network functions manager (VNFM) may delegate PM and/or FM tasks through an element manager (EM).

Figure 11:
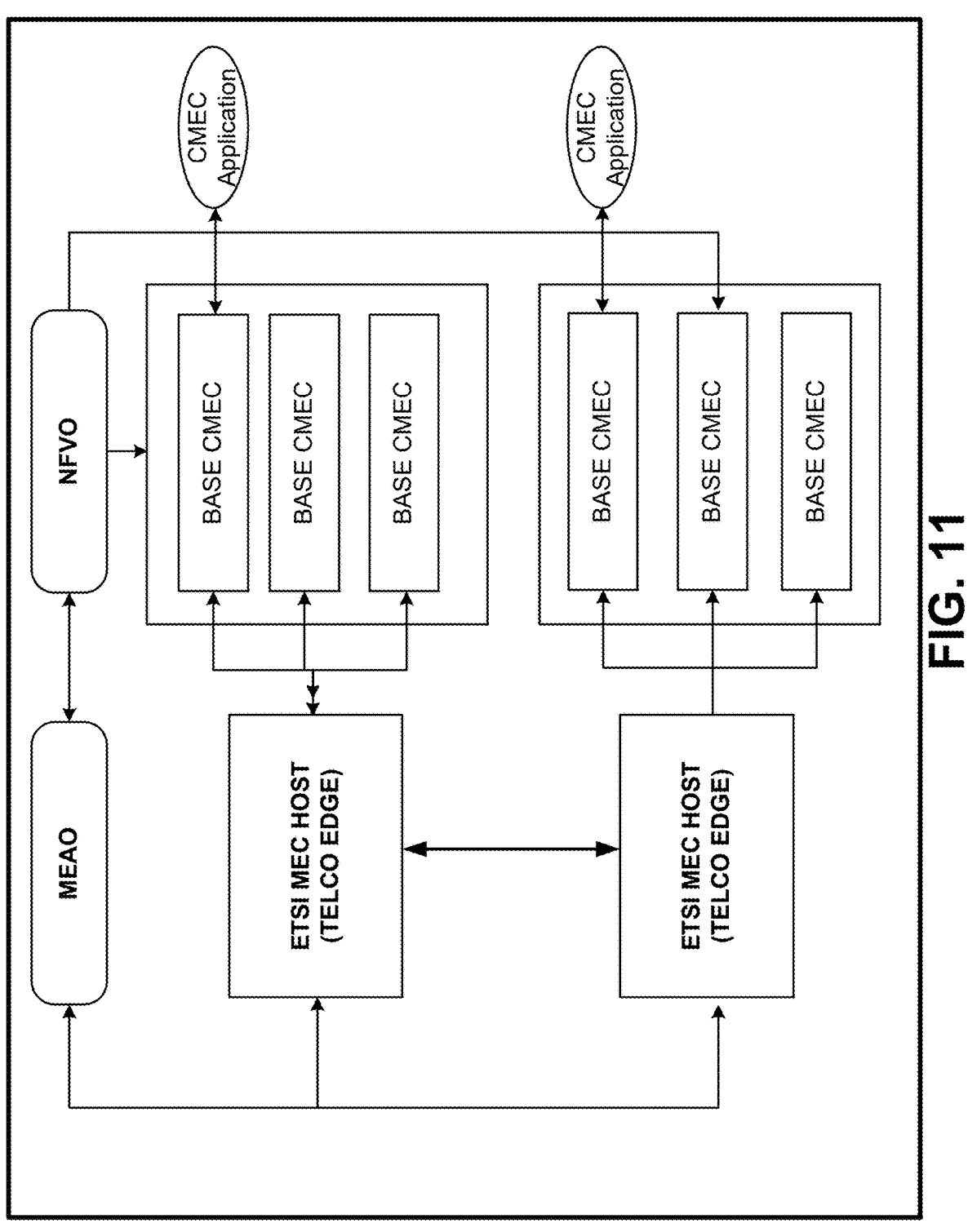
FIG. 11 is a diagram illustrating an example deployment scenario for EMEC and CMEC devices using MEC and/or NFV technology.

FIG. 11 illustrates an example deployment scenario for one or more EMECs (e.g., MEC hosts) and one or more CMEC WTRUs, for example, utilizing MEC and/or NFV technology. As described herein, the deployment may be hierarchical, where an EMEC may be allowed to discover, connect, and/or use services of one or more CMEC WTRUs in the vicinity of the EMEC. The CMEC WTRUs may be managed by an NFVO, and the EMEC(s) may be managed by an MEAO, for example, according to an integrated MEC and NFV architecture. The EMEC(s) and CMEC(s) may be owned by a single operator or by multiple operators.

Figure 12:
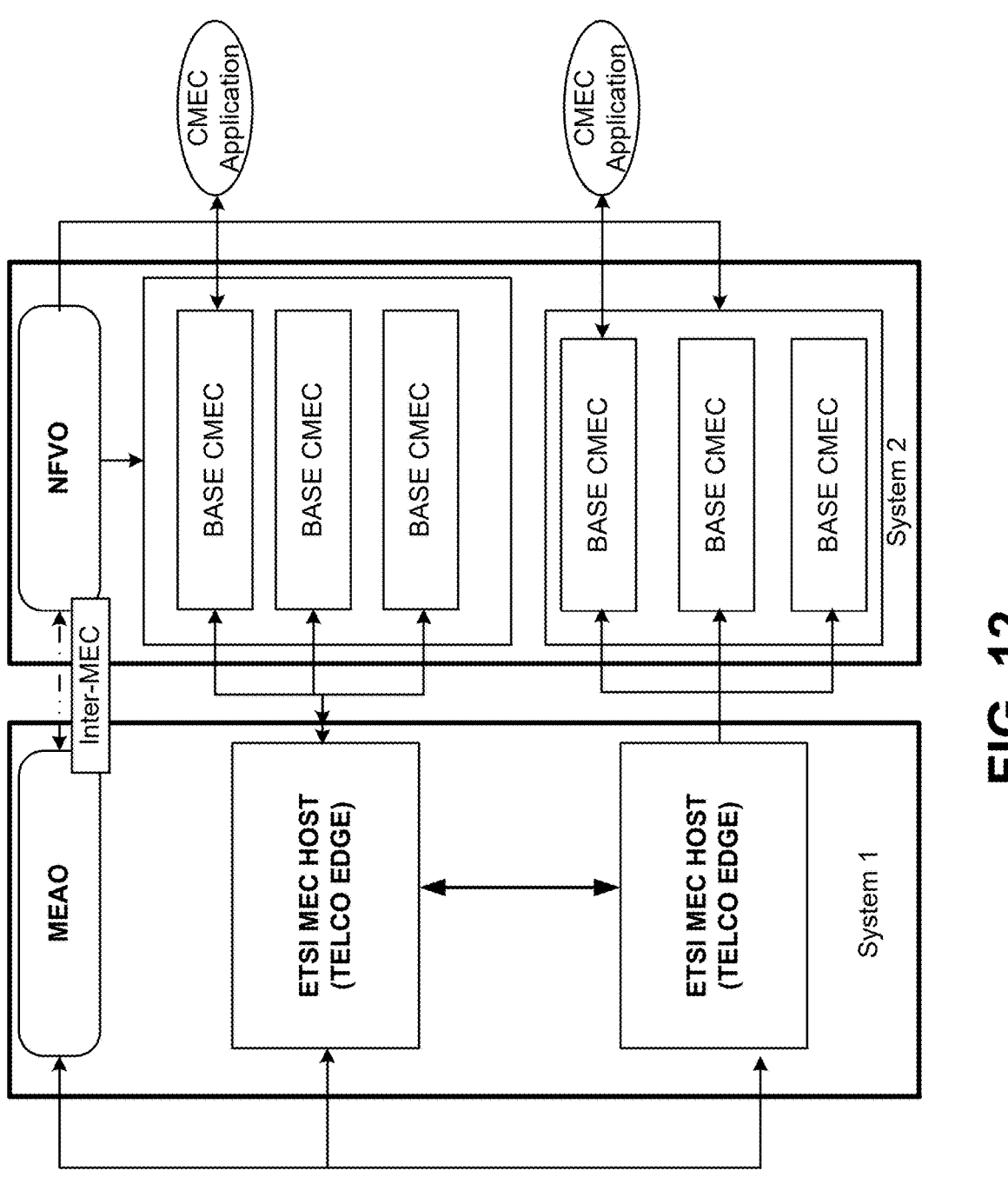
FIG. 12 is a diagram illustrating another example deployment scenario for EMEC and CMEC devices.

FIG. 12 illustrates another example deployment scenario in accordance with one or more embodiments described herein. As shown in FIG. 12, one or more EMECs may be a part of a first system (e.g., System 1) and one or more CMEC WTRUs may be a part of a second system (e.g., System 2). System 1 and System 2 may be owned by a same entity or by different entities. Management entities such as an MEAO and/or an NFVO may be owned by a same owner or by different owners. An interface between the systems may be viewed as an inter-MEC interface, over which authorization, authentication, and/or inter-system configuration may occur.

Figure 13:
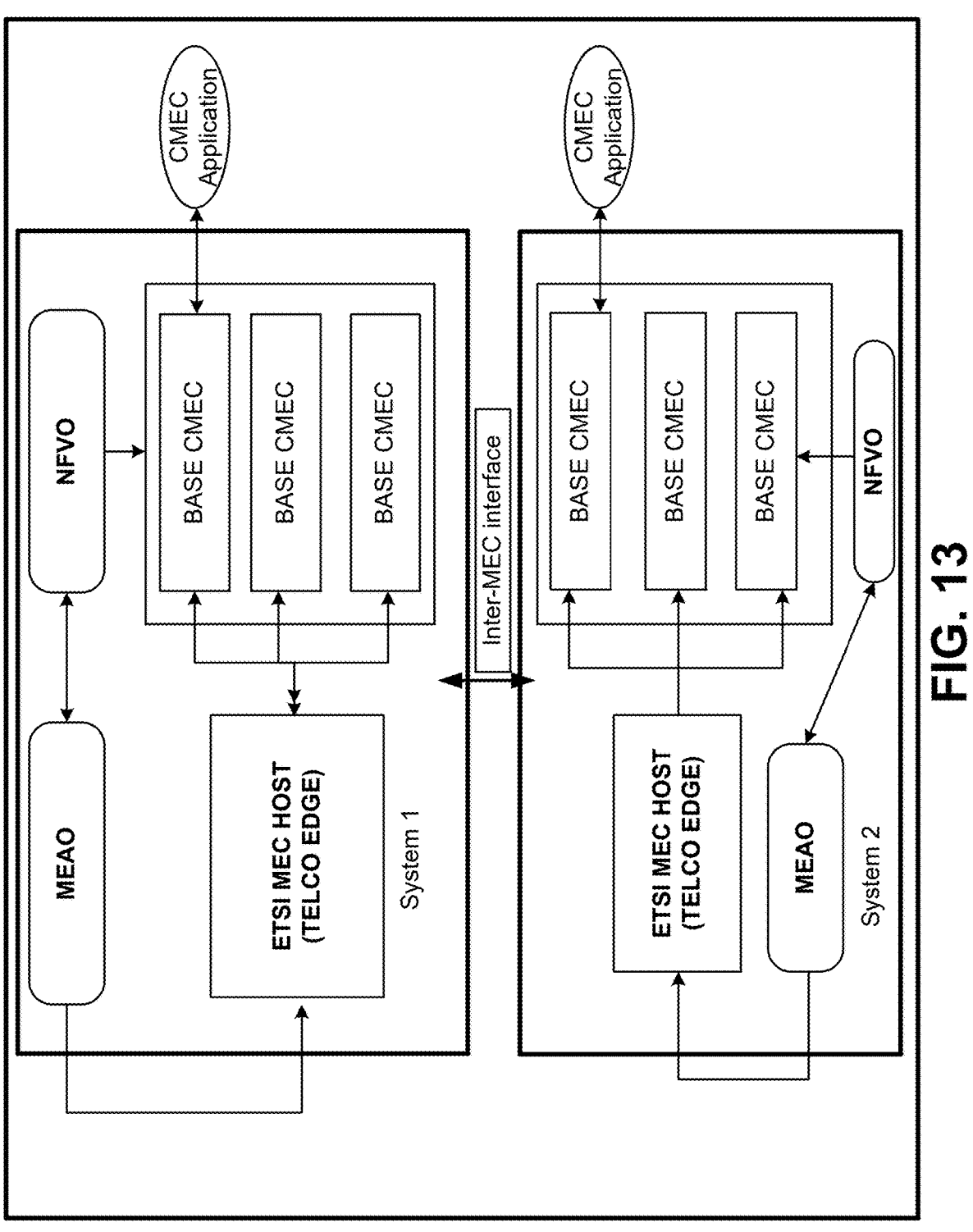
FIG. 13 is a diagram illustrating another example deployment scenario for EMEC and CMEC devices.

FIG. 13 illustrates yet another example deployment scenario in accordance with one or more embodiments described herein. As shown, there may be more than one MEC system at a location and the each MEC system may comprise of one or more EMECs and one or more CMEC WTRUs. These MEC systems may be owned by a same service provider or by different service providers. An inter-MEC interface between the MEC systems may be used for inter-MEAO and/or an inter-NFVO communication.

Figure 14:
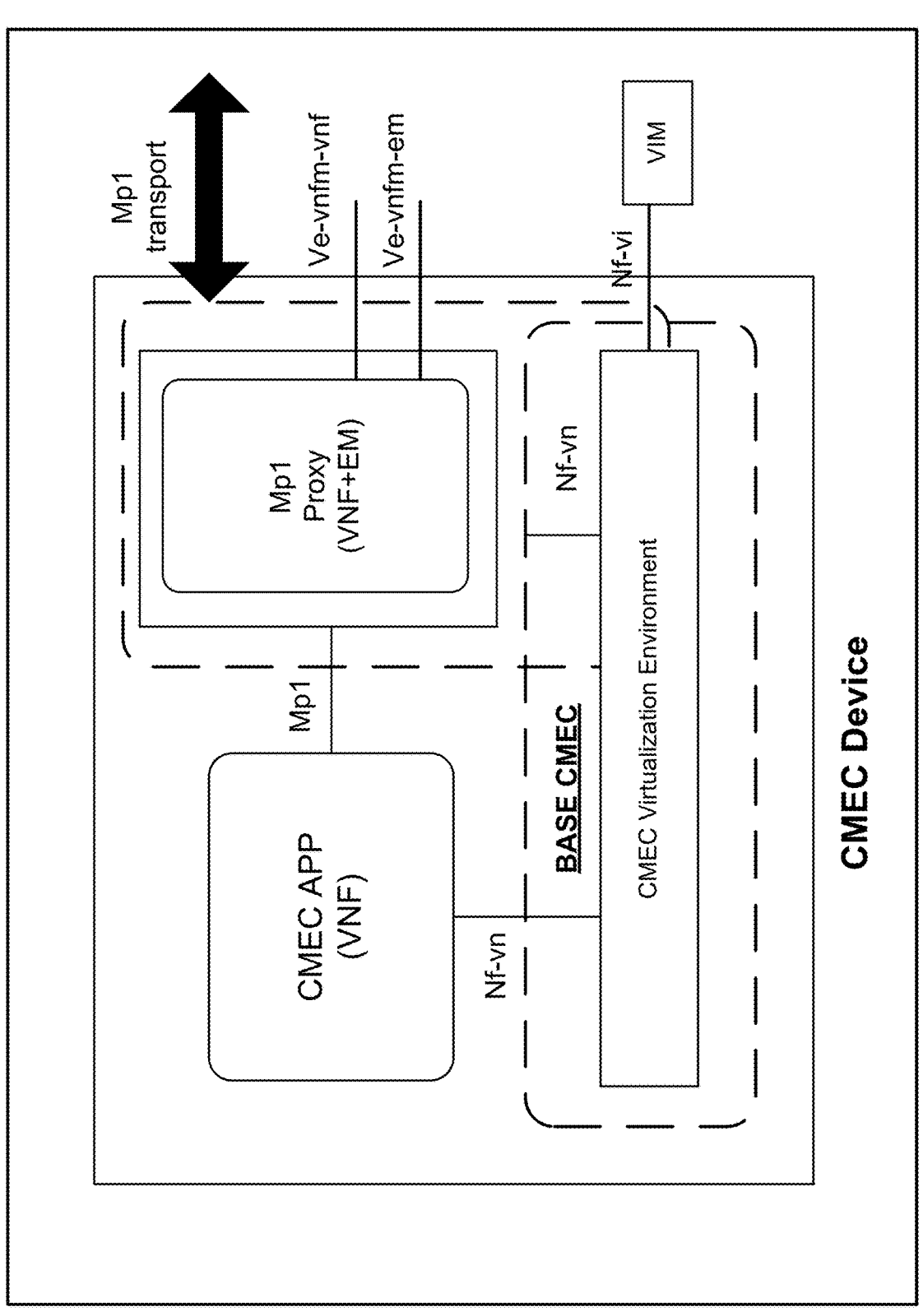
FIG. 14 is a diagram illustrating an example CMEC device.

As described herein, a CMEC WTRU may include (e.g., implement) an Mp1P that may be a function, interface, or proxy (and/or corresponding support functions) configured to communicate with an EMEC. FIG. 14 illustrates an example of such a CMEC WTRU. As shown, the CMEC WTRU may be equipped with a virtualization environment (e.g., a general-purpose virtualization environment referred to herein as a CMEC virtualization environment) that may support an interface (e.g., such as an Nf-vi interface) for VNF deployment. Since the CMEC WTRU may be deployed with such a virtual environment (e.g., an NFV may be used to manage the CMEC WTRU), the Mp1P used by the CMEC WTRU to communicate with an EMEC may also be implemented as a virtual network function (e.g., virtualized as a container and deployed in the CMEC WTRU). As shown in FIG. 14, the Mp1P may be deployed and/or configured using one or more interfaces or reference points such as a Ve-vnfm-vnf and/or a Ve-vnfm-em.

The Mp1P may provide (e.g., expose) an interface (e.g., an Mp1 interface) to a CMEC app in the CMEC WTRU. The Mp1P may maintain a mapping of CMEC apps to interface identifiers (e.g., each CMEC app may use a respective Mp1 interface or multiple CMEC apps may share a same Mp1 interface). The Mp1P may also provide an interface for communicating with an EMEC, and the Mp1P may identify the interface by an identifier. In examples, the Mp1P may maintain (e.g., create, modify, and/or receive) end-to-end identifiers (e.g., transport identifiers) for CMEC applications and/or EMEC(s). The identifiers may be used to support MEC functions (e.g., Mp1 functions) such as those from the CMEC apps to the EMEC(s) and vice versa. The end-to-end identifiers (e.g., transport identifiers) may include one or more of the interface identifiers (e.g., all of the interface identifiers) described herein, and from a CMEC application's point of view, the end-to-end identifiers may allow an MEC operation (e.g., an MP1 operation) to reach the desired EMEC.

The Mp1P may be configured to set up or choose (e.g., or triggering the setup or choice of) a transport mechanism from an CMEC app to an EMEC and vice versa. The Mp1P may create or receive an identifier for a transport between the CMEC app and the EMEC. The Mp1P may update, modify, and/or delete the transport identifier, for example, based on a notification or request from the CMEC app or the EMEC. The CMEC app may include a VNF that may be managed by a reference point such as a Ve-vnfm-vnf and/or a Ve-vnfm-em. The CMEC app may be pre-configured with (e.g., informed about) an Mp1 interface in the CMEC device, for example, via a Ve-vnfm-vnf interface and/or by the application developer (e.g., using a published or known entry point). When referred to herein, a transport may include any mechanism (e.g., a network link, a transport channel, etc.) for transferring data and/or control information between a CMEC app and an EMEC.

Figure 15:
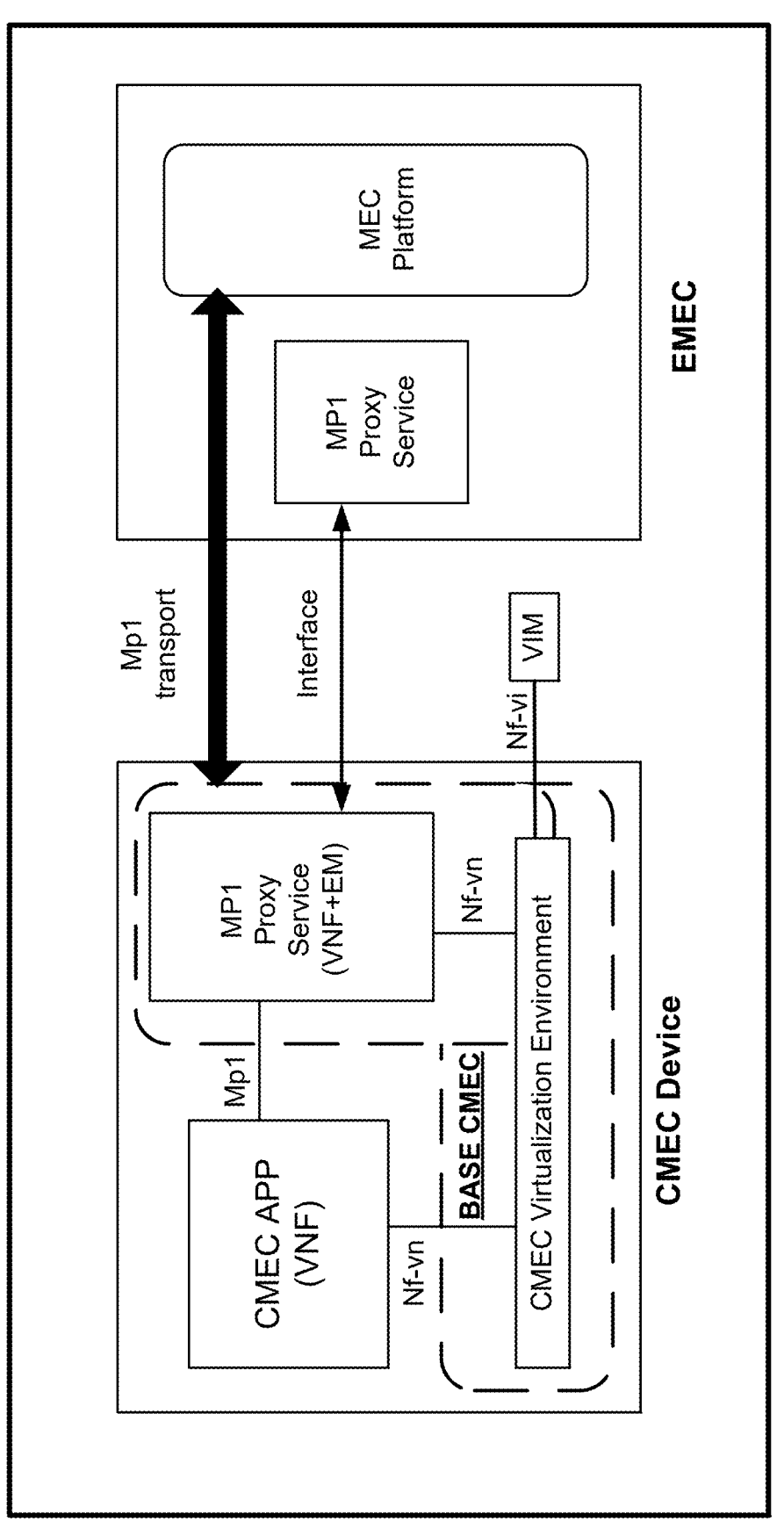
FIG. 15 is a diagram illustrating an example of a CMEC device interacting with an EMEC.
Figure 17:
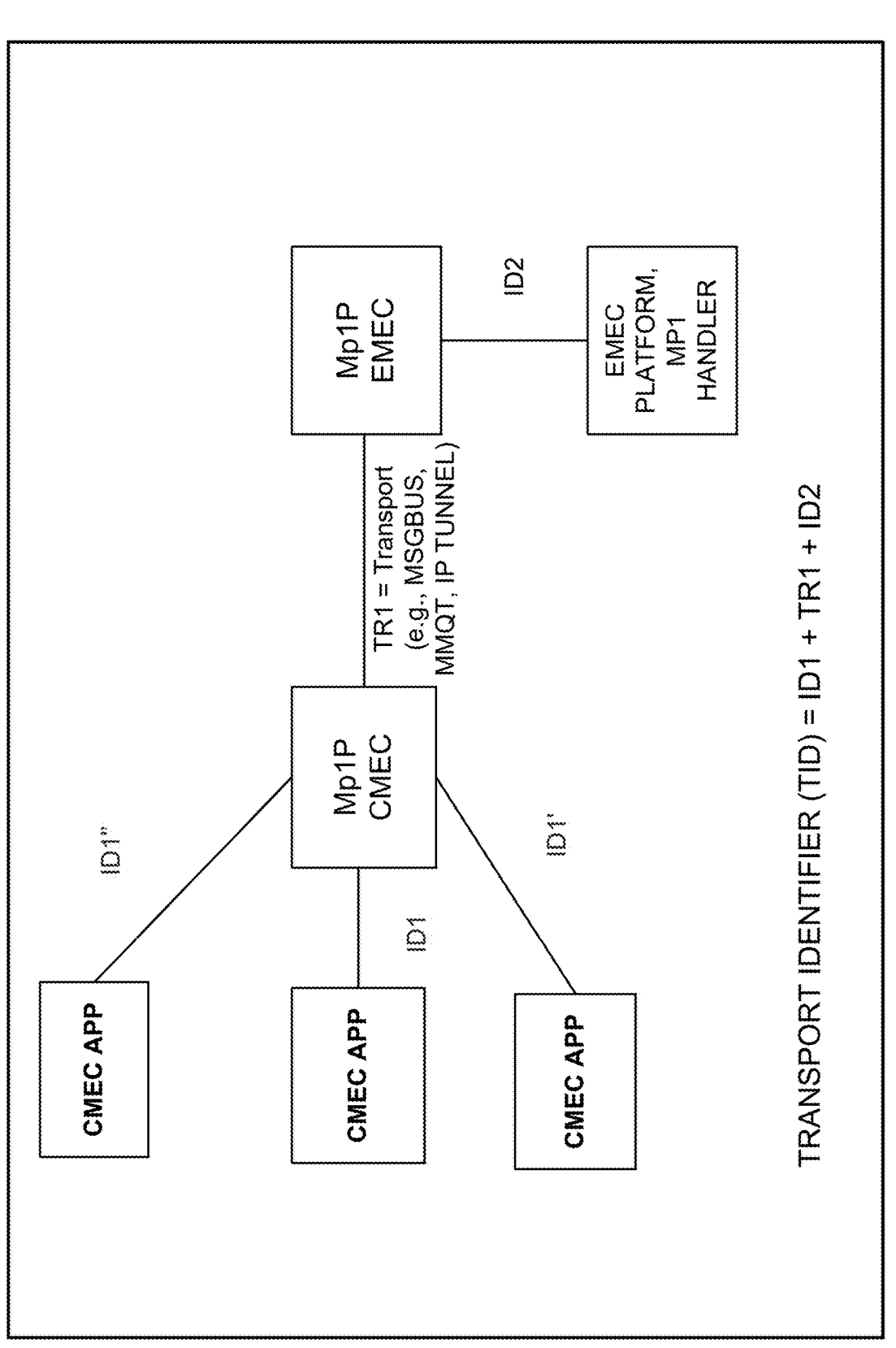
FIG. 17 is a diagram illustrating an example transport identifier.

FIG. 15 illustrates an example of interaction between a CMEC WTRU and an EMEC. The EMEC may support one or more Mp1P functions as described herein to enable dynamic integration of CMEC WTRUs into an MEC system. The Mp1P on the EMEC may expose an MEC app enablement function to MEC apps on the CMEC WTRU, for example, through an extended Mp1 interface (e.g., labeled "Interface" in FIG. 15). A peer control function to support the Mp1P may be implemented on the EMEC, and the interface between corresponding Mp1P's on the EMEC and the CMEC WTRU may be used for creating and/or passing identifiers (e.g., such as an end-to-end transport identifier) between the EMEC and the CMEC WTRU to facilitate an MEC operation. In a way, the extended interface that allows an MEC app on the CMEC WTRU to access an MEC platform on the EMEC may be regarded as a virtual interface (e.g., as compared a standard Mp1 interface between the MEC platform on the EMEC and an MEC app on the EMEC). The virtual interface may be exposed to the MEC app on the CMEC as one (e.g., a single) interface, even though at an implementation level the virtual interface may include multiple parts such as, for example, a first interface between the MEC app and the Mp1P on the CMEC WTRU, a second interface between the Mp1P on the CMEC WTRU and the Mp1P on the EMEC, and a third interface between the Mp1P on the EMEC and the MEC platform on the EMEC. The virtual interface may be identified by an identifier such as a transport identifier that may be created or determined based on a combination of the identifiers associated with the different parts of the virtual interface (e.g., as shown in FIG. 17).

The transport identifier described herein may identify a transport from an MEC app on a CMEC WTRU (e.g., referred to as a CMEC app) to an MEC platform on an EMEC. Messages (e.g., Mp1 messages) from the CMEC app may be transported as is through the virtual interface described herein (e.g., an extended Mp1 interface) or the messages may be modified (e.g., by adding one or more new data fields) by the virtual interface. The CMEC app may use the virtual interface to obtain platform services (e.g., MEC services) from the EMEC. The CMEC app may register with the EMEC, for example, via the virtual interface, and may (e.g., after registration) use application programming interfaces (APIs) such as standard Mp1 APIs to discover and use other MEC apps (e.g., on the EMEC).

In examples, an extended Mp1 interface may be provided. The extended Mp1 interface may be from an MEC app in a CMEC WTRU to an Mp1P in the CMEC WTRU, to an Mp1P in an EMEC, and to an MEC platform in the EMEC. Such an end-to-end extended Mp1 interface may include a number of parts, which may be identified by respective identifiers (e.g., a combination of identifiers). The end-to-end extended Mp1 interface may be referred to herein as a virtual Mp1 interface to an MEC app in a CMEC WTRU (e.g., a single virtual Mp1 interface to the MEC app in the CMEC WTRU for the MEC app to access an MEC platform on an EMEC).

Figure 16:
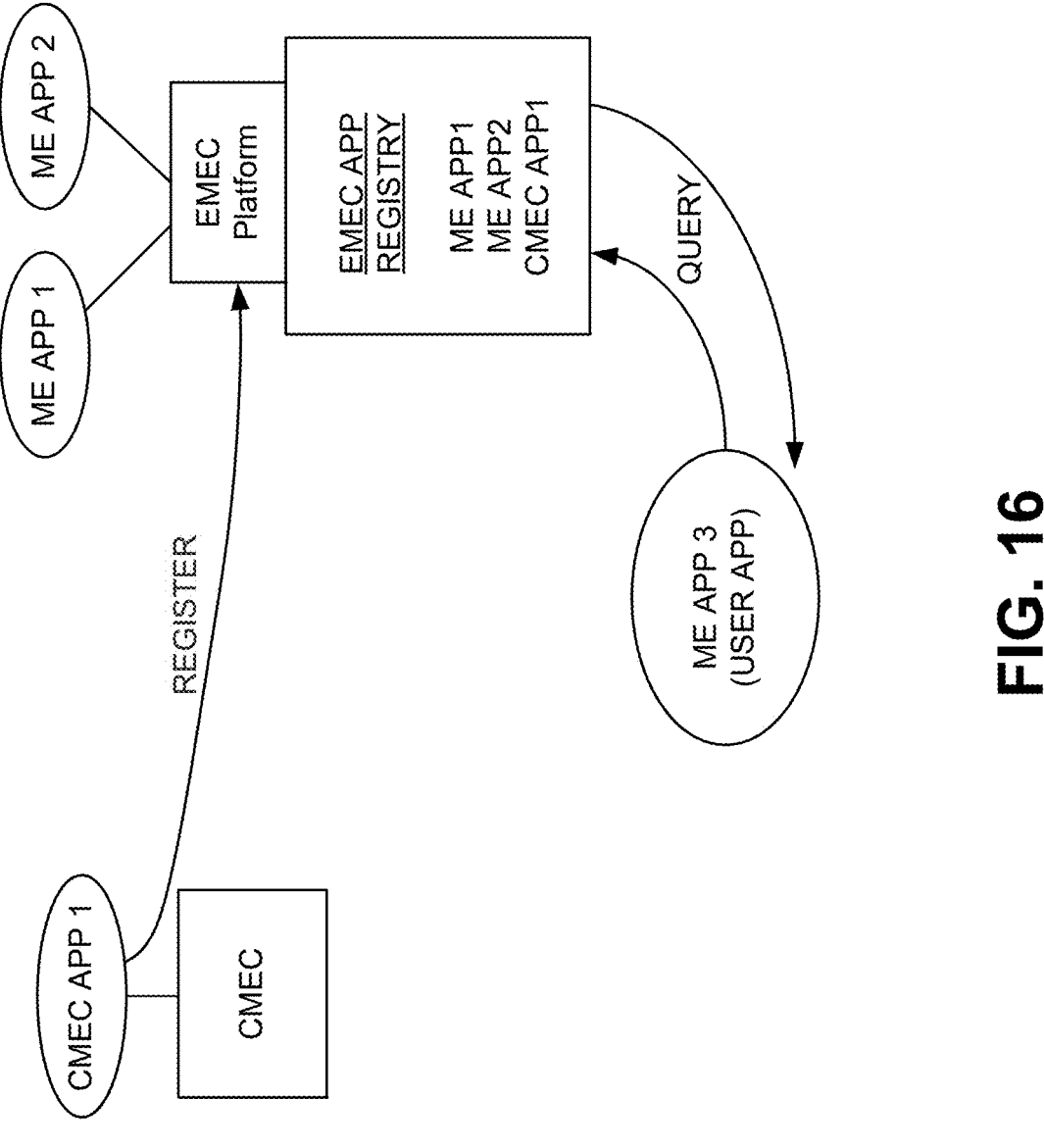
FIG. 16 is a diagram illustrating an example of a CMEC application registering with an EMEC and discovering other MEC Apps.

FIG. 16 illustrates an example of CMEC app registration with an EMEC and discovering/using other multi-access edge (ME) apps. As shown, after CMEC APP1 registers with an EMEC, MEC APP3 (e.g., a user app) may query the EMEC and obtain a list of available MEC apps including CMEC App1 from the EMEC.

FIG. 17 illustrates an example of creating and using a transport identifier during MEC operations. The transport identifier may be created to register and/or identify a CMEC app (e.g., a transport associated with the CMEC app). A function such as the Mp1P described herein may support creating a virtual interface (e.g., an extended Mp1 interface) between a CMEC WTRU (e.g., host of the CEMC app) and an EMEC. The Mp1P may set up and/or negotiate a transport (e.g., a message bus (MSGBUS), a message queuing telemetry transport (MQTT), an IP tunnel, etc.) between the EMEC and the CMEC app. From a user's point of view, the transport identifier may identify an end-to-end transport between the CMEC app and the EMEC (e.g., an MEC platform on the EMEC). As shown in FIG. 17, the transport identifier (e.g., TID) may include a combination (e.g., an aggregate) of a first ID (e.g. ID1) that identifies the Mp1P and/or the CMEC app on the CMEC WTRU, a second ID (e.g., ID2) that identifies the Mp1P and/or the EMEC platform on the EMEC, and/or a third ID (e.g., TR1) that identifies the transport between the CMEC WTRU and the EMEC.

The creation of the transport identifier may be initiated by the CMEC app, for example, by sending a request (e.g., a Create or Registration request) to the Mp1P. The CMEC app may be provisioned with information for reaching the Mp1P in the CMEC WTRU. The provisioning may be performed using an application descriptor, for example. Table 1 below shows an example of such an application descriptor, which may include an Mp1P uniform resource identifier (URI) along with other information, where M may indicate an attribute may be used (e.g., may be mandatory).

interface ID when requesting a transport creation, modification, and/or deletion and an EMEC may use this interface ID (e.g., as part of a transport ID) to identify and track messages coming from the MEC App. In examples, the MEC App, before it may start operation, may obtain the interface id and then may obtain a transport ID.

At 1, the MEC App may obtain an identifier such as a transport ID associated with an MEC service by sending a request to the Mp1P over the interface between the MEC App and the Mp1P. The MEC App may provide an identifier of the MEC App (e.g., AppId) and/or the identifier of the interface (e.g., an InterfaceId obtained at step 0) in the request to the Mp1P. The request from the MEC App may trigger a negotiation (e.g., a transport negotiation) between the CMEC WTRU and an EMEC. The negotiation may include, for example, authentication information exchange, transport end-points ID exchange, transport end-points location exchange, etc.

At 2, the Mp1P on the CMEC WTRU may create and/or store a mapping between the AppId and the InterfaceId described above. The Mp1P may send a message (e.g., a transport ID creation request) to an EMEC (e.g., to a Mp1P on the EMEC). The message may serve as an indication that the MEC App on the CMEC WTRU desires to join an MEC service provided by the EMEC, and the message include, e.g., the AppID and/or InterfaceId described above, and/or a CMEC WTRU Id (e.g., to identify the CMEC WTRU). The CMEC WTRU Id may be provisioned during deployment of the CMEC WTRU, and the Mp1P on the CMEC WTRU

TABLE 1

| Example attributes of an application descriptor | | | | |
| --- | --- | --- | --- | --- |
| Attribute Name | Qualifier | Cardinality | Data Type | Description |
| appID | M | 1 | String | Identifier of the Mp1P. This attribute may be globally unique |
| appName | M | 1 | String | Name that identifies the Mp1P |
| appSoftVersion | M | 1 | String | Identifier of the version of software of the Mp1P |
| mecVersion | M | 1 . . . N | String | Identifies version(s) of an ME system compatible with the MEC App |
| mp1pUri | M | 1 | URI | Address of an interface exposed by the Mp1P |

Figure 18:
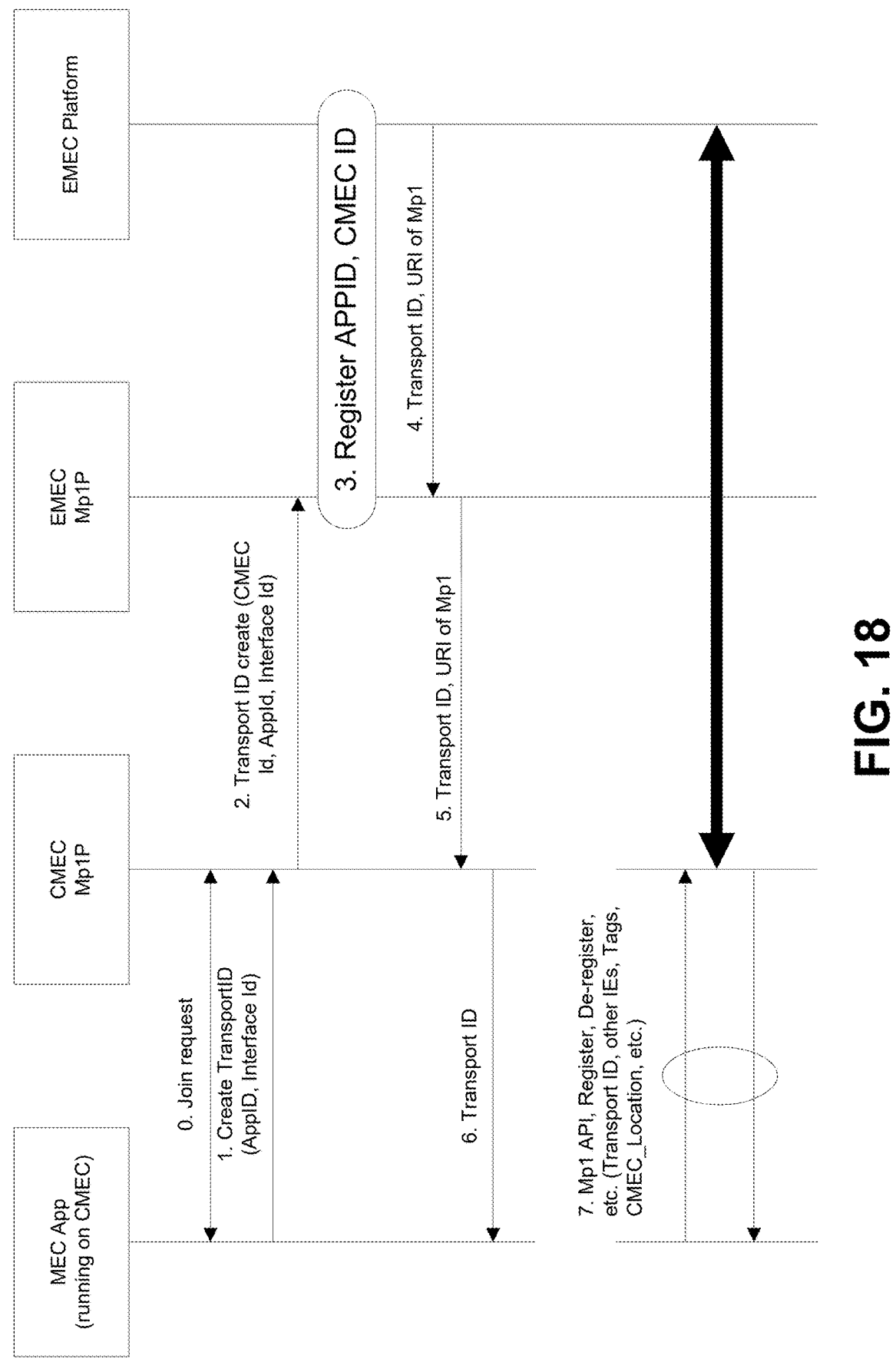
FIG. 18 is a diagram illustrating an example process for registering a CMEC app with an MEC host.

FIG. 18 illustrates an example process for registering a CMEC app. As shown, at 0, an MEC App installed and running on a CMEC WTRU may send a request to an interface, function, service, or proxy implemented on the CMEC WTRU (e.g., referred to herein generally as an Mp1P) to join (e.g., participate in) an MEC service. The MEC App may be a VNF, which may be configured using a Ve-vnfm-vnf interface and/or may be provided with URI information of the Mp1P (e.g., network address of the Mp1P) for interacting with the Mp1P. For example, an Mp1P URI may be pre-created (e.g., the URI may be a known URI) and may be provided to the MEC App via an application descriptor associated with the MEC App as described herein (e.g., by an application developer). The MEC App may send the join request to the Mp1P based on the Mp1P URI, and the Mp1P may send an interface ID (e.g., ID of an interface between the MEC App and the Mp1P) to the MEC App (e.g., the Mp1P may expose the interface to the MEC App in this way). The MEC App may use this may know how to reach the EMEC Mp1P also based on information provisioned during deployment.

At 3, the EMEC Mp1P may register the AppId, an application descriptor (e.g., AppDescriptor) associated with the MEC App on the CMEC WTRU, and/or the CMEC WTRU Id with an MEC platform on the EMEC (e.g., referred to herein as an EMEC platform). The EMEC platform may create a transport ID, for example, based on the AppId and CMEC WTRU Id (e.g., the transport ID may be uniquely associated with the MEC App on the CMEC WTRU).

At 4, the EMEC platform may send the transport ID and/or a URI for an Mp1 interface back to the EMEC Mp1P. Such a URI may be used (e.g., directly) by the Mp1P on the CMEC WTRU to send an API call (e.g., an Mp1 API call that may include a data or control message associated with the MEC service) to the EMEC platform. The EMEC Mp1P may store the transport ID and/or the Mp1 URI, and may associate these values with the AppId and the CMEC WTRU Id received from the CMEC Mp1P.

At 5, the EMEC Mp1P may forward the transport ID and/or the Mp1 URI described above to the CMEC Mp1P, for example, in an acknowledgment message. In response to receiving the acknowledgment message, the CMEC Mp1P may store the received transport ID and/or the Mp1 URI, for example, in addition to the AppId and/or InterfaceId described above.

At 6, the CMEC Mp1P may send the transport ID to the MEC App. For example, the CMEC Mp1P may send a response to the MEC App and may include the transport ID in the response. At 7, the MEC App may initiate an API call (e.g., a standard Mp1 API call including a data or control message associated with an MEC service) on the CMEC Mp1P by providing the transport ID to the CMEC Mp1P. The CMEC Mp1P may use the transport ID to determine a corresponding Mp1 URI on the EMEC (e.g., based on records stored by the CMEC Mp1P), and may use this URI to send the API call, along with the transport ID and/or data associated with the API call, to the EMEC platform (e.g., using a direct data path between the CMEC Mp1P and the EMEC platform that may bypass the EMEC Mp1P). The EMEC platform may use the transport ID to determine the MEC App (and/or the corresponding CMEC ID) from which the API call is received. The MEC App on the CMEC may also provide other information elements (IEs) when sending the API call. For example, the MEC App may include an Application Tag with its value set to "CMEC APP." The Application Tag may allow an application registry on the EMEC to track the CMEC application. The Application Tag may also allow other MEC Apps (e.g., on the EMEC) to know that an MEC application is running on the CMEC WTRU and may be available for consumption. Also at 7, the CMEC App may indicate its location (e.g., location of the CMEC WTRU) to the EMEC and the EMEC may store the location information in a CMEC registry such that other MEC Apps may learn the location of the MEC App on the CMEC.

Once the MEC App on the CMEC WTRU registers successfully with the EMEC, the EMEC and/or MEC app(s) on the EMEC may discover the CMEC app and may begin to use it. Conversely, the CMEC app may also learn about the MEC app(s) on the EMEC and may begin to use those apps. The CMEC app may also learn about other CMEC app(s) in the vicinity of the EMEC, and may interact with those apps as well.

Figure 19:
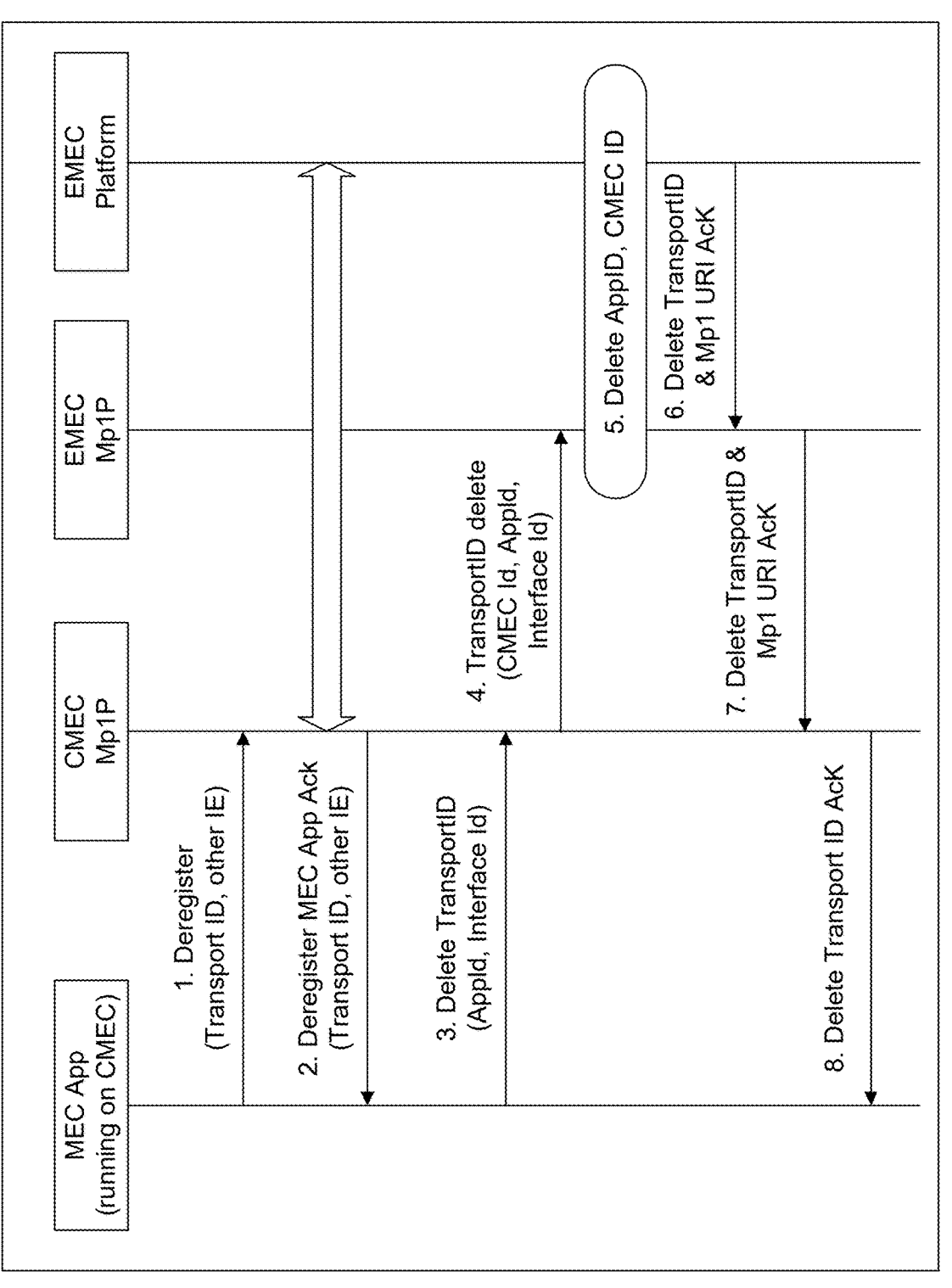
FIG. 19 is a diagram illustrating an example process for de-registering a CMEC app.

FIG. 19 illustrates an example process for de-registering a CMEC app (e.g., an MEC app running on a CMEC WTRU). The CMEC app may de-register with an EMEC (e.g., via respective Mp1P's on the CMEC and the EMEC) and/or delete (e.g., give up) a transport ID previously assigned to the CMEC app. As shown in FIG. 19, at 1, the CMEC app may send a request to an Mp1P on the CMEC WTRU (e.g., via a standard Mp1 API provided by the CMEC Mp1P) to de-register the CMEC app. The request may include, for example, the transport ID previously assigned to the CMEC app and/or other IEs such as an ID of the CMEC app (e.g., AppID) identifying the app, a name of the CMEC app (e.g., AppName), an owner of the CMEC app (e.g., AppOwner), and/or a location of the CMEC app (e.g., AppLocation).

At 2, the de-registration may be performed over a transport between the CMEC app and the CMEC Mp1P (e.g., as a regular Mp1 operation) and an acknowledgment (ACK) of the de-registration may be sent to the CMEC app.

At 3 (e.g., as part of the de-registration or following the de-registration), the CMEC app may request (e.g., further request) that the transport ID associated with the CMEC app be deleted (e.g., dis-associate the transport ID with the CMEC app). The CMEC app may use an interface (e.g., an Mp1 interface) to request deletion of the transport ID or the request may be indicated (e.g., implicitly) by the de-registration operation. The CMEC app may provide its AppId and/or the ID of the interface (e.g., InterfaceId) between the CMEC app and the CMEC Mp1P to the CMEC Mp1P.

At 4, the CMEC Mp1P may send a request to an EMEC (e.g., an Mp1P on the EMEC) to de-register the CMEC app and/or delete the transport ID associated with the CMEC app (e.g., dis-associate the transport ID with the CMEC app). The request may include the ID of the CEMC app (e.g., AppId), the ID of the interface between the CMEC app and the CMEC Mp1P (e.g., InterfaceId), and/or an ID of the CMEC WTRU (e.g., CMEC ID).

At 5, the EMEC Mp1P may delete the app ID of the CMEC app, a descriptor of the CMEC app, and/or the ID of CMEC WTRU, for example, by sending a request to an MEC platform on the EMEC (e.g., referred to herein as an EMEC platform).

At 6, the EMEC platform may delete (e.g., deactivate or dis-associate) the transport ID and an Mp1 URI corresponding to the CMEC app (e.g., identifiable by the app's AppId and/or CMEC ID). The EMEC platform may send a delete Ack to the EMEC Mp1P.

At 7, the EMEC Mp1P may send the delete Ack to the CMEC Mp1P. The CMEC Mp1P may add the deleted transport ID, Mp1 URI, app ID, and/or interface ID to a list (e.g., a deleted transport ID list).

At 8, the CMEC Mp1P may send a delete Ack for the transport Id back to the CMEC app.

Figure 20:
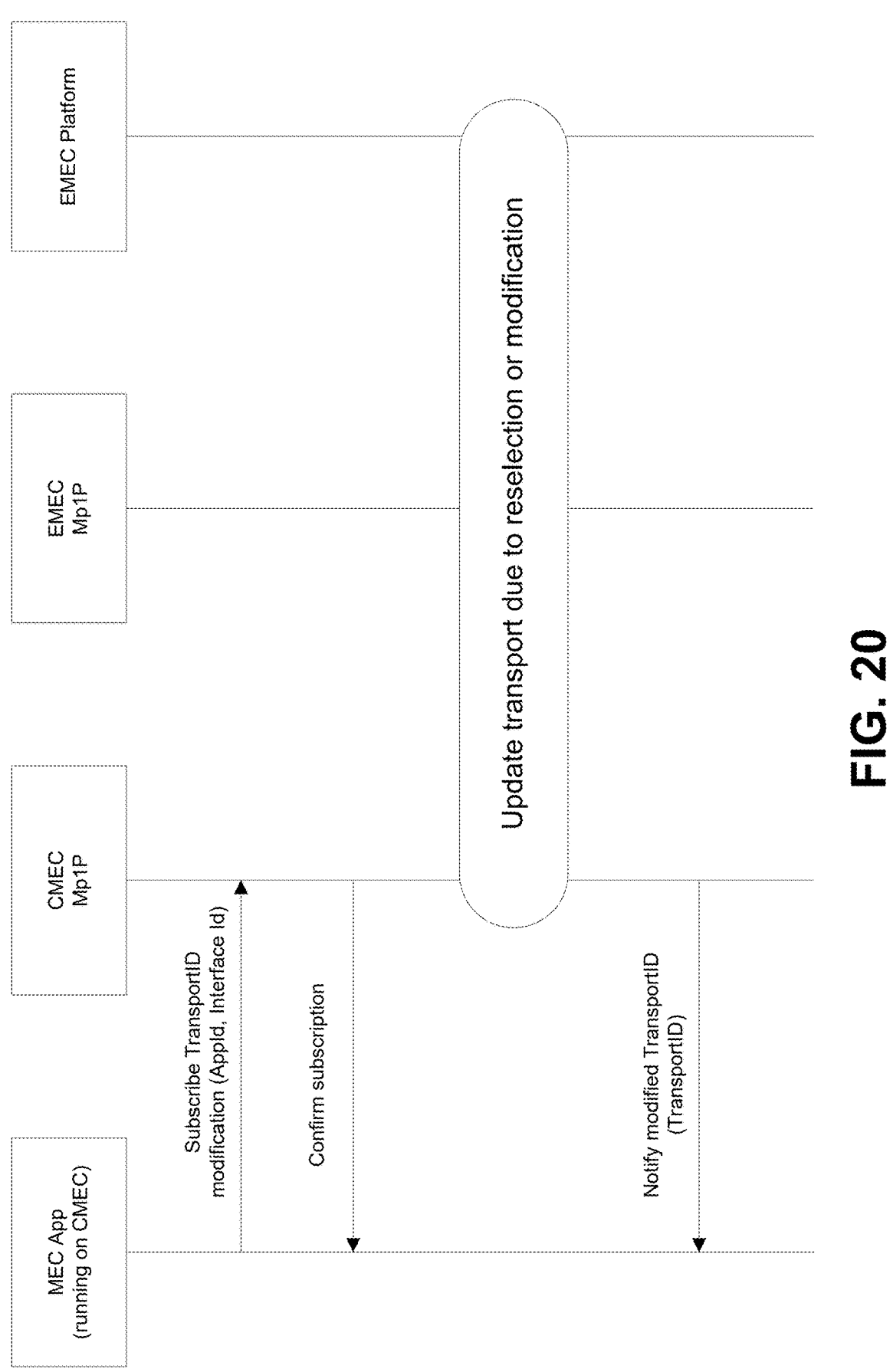
FIG. 20 is a diagram illustrating an example process for modifying an MEC transport.

FIG. 20 illustrates an example transport identifier modification procedure. A transport ID associated with a CMEC WTRU or an MEC app on a CMEC WTRU may be modified, for example, where the CMEC WTRU has moved and needs to re-establish or re-select a transport. An Mp1P on the CMEC WTRU may be configured to handle the change of transport and may inform the CMEC app about the change (e.g., about a new transport ID assigned to the CMEC app).

As shown in FIG. 20, an CMEC app may subscribe (e.g., send a request) to a CMEC Mp1P for a transport ID change, and the CMEC Mp1P may confirm the subscription or request. The CMEC Mp1P may also decide to re-select and/or modify a transport without receiving an explicit request from the CMEC app. For example, the CMEC Mp1P may decide to modify a transport based on the mobility event (e.g., movement of the CMEC WTRU) and/or a load condition of the CMEC WTRU. In either case, the CMEC Mp1p may notify the CMEC app about a modified (e.g., new) transport ID, for example, after interacting with an EMEC (e.g., an Mp1P and/or MEC platform on the EMEC). The procedures and/or messages described herein for transport ID creation may be applied to the transport ID modification process.

Figure 21:
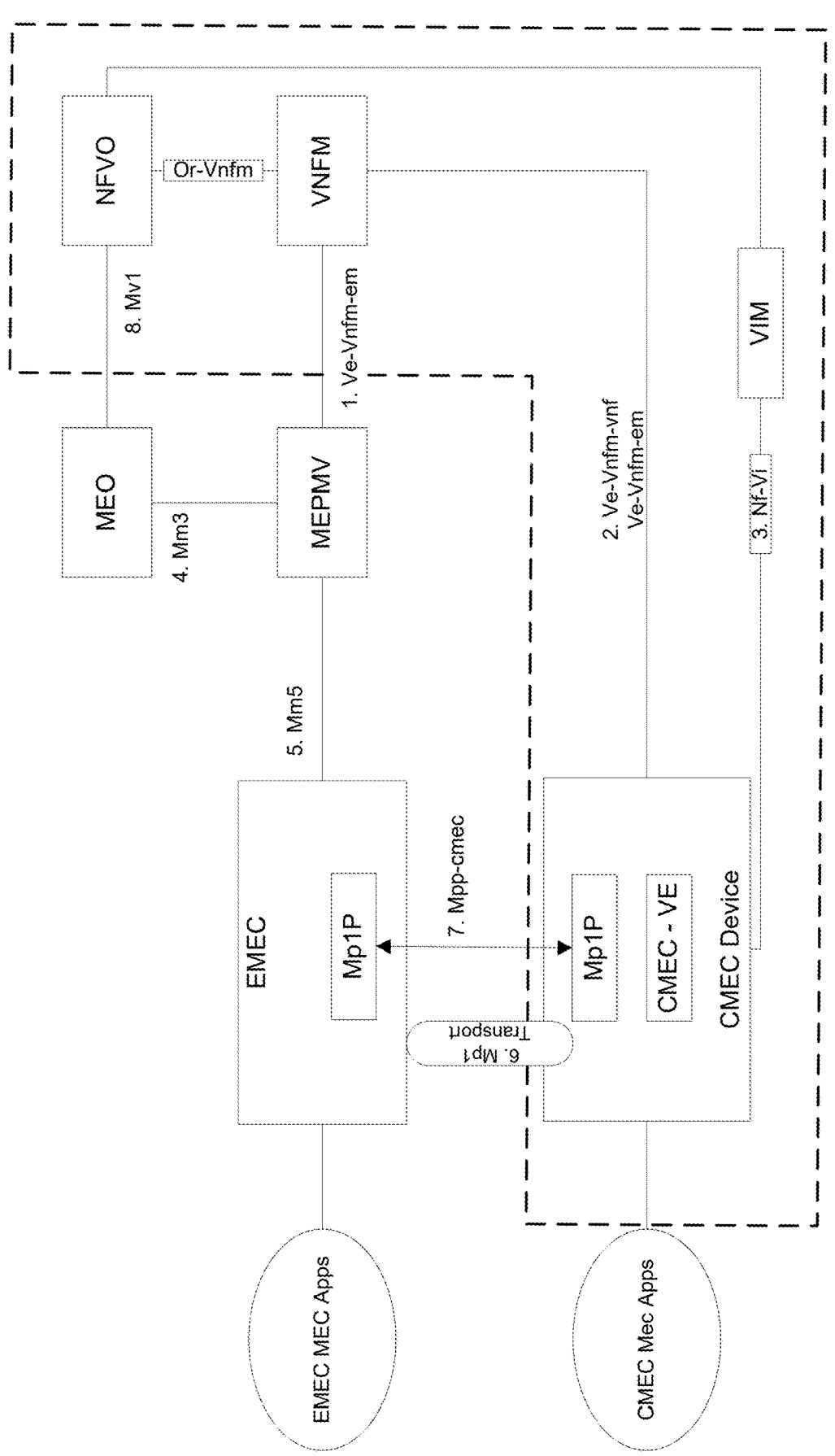
FIG. 21 is a diagram illustrating an example of integrated EMEC and CMEC deployment.

FIG. 21 illustrates an example of integrated EMEC and CMEC WRU deployment (e.g., functional architecture, interfaces, etc.). As shown, an EMEC may be managed by an MEO while the management and orchestration of CMEC WTRUs (e.g., CMEC devices) may utilize NFV technology. The management and/or configuration of the EMEC and CMEC WTRUs may be performed through one or more MEC and/or NFV interfaces, for example, due to the integration of the CMEC WTRUs with the EMEC.

Through a first interface such as the Ve-Vnfm-em shown in FIG. 21, a VNFM may share CMEC information with a mobile edge platform manager VNF (MEPMV). The shared information may include a cMEC ID (e.g., ID of the CMEC WTRU), a cMEC name (e.g., name of the CMEC WTRU), a cMEC location (e.g., location of the CMEC WTRU), and/or an Mp1P URI (e.g., an URI of an Mp1P on the CMEC WTRU). The location information (e.g., cMEC location) may allow the EMEC to determine that the CMEC WTRU is in the proximity of the EMEC and choose the CMEC based on the determination. The Mp1P URI may allow the EMEC to reach the CMEC Mp1P (e.g., know how to reach the CMEC Mp1P).

Through a second interface such as a Ve-Vnfm-vnf, a Ve-Vnfm reference point may connect a VNFM with the VNF, and through a third interface such as a Ve-Vnfm-em, a Ve-Vnfm reference point may connect the VNFM with an element manager (EM) of the Mp1P on the CMEC WTRU (e.g., CMEC device shown in the figure). A reference point or interface such as the Ve-Vnfm-vnf may be used to perform life cycle management and/or configuration management. Life cycle management may include events such as Mp1P initialization, which may be performed based on a description of the Mp1P, one or more Mp1P attributes (e.g., associated with computation and/or networking), images and cloud-nit files, an Mp1P URI, etc. Configuration management may allow an Mp1P to be configured after its successful instantiation. The configuration of the Mp1p may enable it to interact with other functions such as the EMEC, for example, as described herein. Initial configuration parameters of the Mp1P may be set, for example, as illustrated in Table 2 below, and information (e.g., messages) may be exchanged between the Mp1P and a VNFM, for example, over a Ve-Vnfm-vnf. Table 3 below illustrates examples messages that may be exchanged between the Mp1P and the VNFM.

TABLE 2

Examples of initial configuration parameters of an Mp1P

| Parameter | Cardinality | Content | Description |
|---|---|---|---|
| Mp1PId | 1 | Identifier | Uniquely identifies the Mp1P |
| Mp1PConfigData | 1 | Mp1P configuration | Configuration data for the Mp1P instance |
| >swImageDesc | 1 | Identifier (Reference to SwImageDesc) | Describes the software image which may be directly loaded on the Mp1P |
| >monitoringParameter | 0 . . . N | MonitoringParameter | Specifies virtualized resource related performance metrics at the Mp1P level to be tracked by the VNFM |
| >configurableProperties | 0 . . . 1 | Mp1PConfigurableProperties | Describes the configurable properties of Mp1P |
| >>selfAddress | 0 . . . 1 | Structured(Inline) | Network address that has been configured for the VNF Mp1P |
| >>>macAddress | 0 . . . 1 | MacAddress | Mac address assigned to the VNF Mp1P |
| >>>ipAddress | 0 . . . 1 | IpAddress | IP address assigned to the VNF Mp1P |
| >>emecAddress | 0 . . . 1 | | Network address to reach the EMEC |
| >>>macAddress | 0 . . . 1 | MacAddress | MAC address to reach the EMEC |
| >>>ipAddress | 0 . . . 1 | IpAddress | IP address to reach the EMEC |
| >cpuResourceLimit | 0 . . . 1 | Integer | Number of CPU resources the Mp1P containerized entity may maximally use |
| >memoryresourceLimit | 0 . . . 1 | Number | Amount of memory resources the Mp1P containerized entity may maximally use |
| >virtualLinkInfo | Structured(Inline) | | Provides information about a virtual link instance of Mp1P |
| >>mp1pLinkPorts | 0 . . . 1 | Mp1PLinkPort | Link port of the VNF the Mp1P may use to connect to EMEC |
| >>virtualLinkDescId | 1 | Identifier | Unique identifier of VLD of the Mp1P |

TABLE 3

| Examples messages between an Mp1P and a VNFM | |
|---|---|
| Message | Flow direction |
| SetInitialConfigurationRequest | VNFMàMp1P |
| SetInitialConfigurationResponse | Mp1PàVNFM |

The modification of Mp1P configuration parameters may be carried out by a VNFM, for example, over a Ve-Vnfm-vnf and/or using the example messages illustrated in Table 4 below. Examples of parameters that may be modified are illustrated in Table 5.

TABLE 4

| Examples messages for modifying Mp1P configuration parameters | |
|---|---|
| Message | Flow direction |
| ModifyConfigurationRequest | VNFM→Mp1P |
| ModifyConfigurationResponse | Mp1P→VNFM |

TABLE 5

| Examples of Mp1P configuration parameters that may be modified | | | |
|---|---|---|---|
| Parameter | Cardinality | Content | Description |
| Mp1PId | 1 | Identifier | May uniquely identify the Mp1P |
| Mp1PConfigData | 1 | Mp1P configuration | Configuration data for the Mp1P instance |

A modification of Mp1P configuration parameters may overwrite previous Mp1P configuration parameters, and an Mp1P URI may be sent/provided (e.g., after the modification).

Orchestration and management of a CMEC-VE may be performed via an interface such as an Nf-Vi interface. This interface or reference point may perform resource discovery and/or may assign resources to an Mp1P. Information regarding the Mp1P's capacity and/or utilization may be provided to a VIM, for example, via a Nf-Vi reference point. In case the Mp1P has insufficient computation and/or storage resources, utilization statistics associated with the Nf-V may be used to meet the resource parameters and/or requests of the Mp1P.

An interface or reference point such as an Mm3 reference point between an MEO and an MEPMV may be used for the management of application lifecycle, application rules, requests, and/or parameters of EMEC services. The information carried by the Mm3 and/or a Ve-Vnfm-em may be sent over another reference point such as an Mm5 reference point. For an Mp1 transport, a transport identifier may identify an end-to-end transport from a CMEC app to an EMEC platform. An interface (e.g., such as an Mpp-cmec interface) may be established between an Mp1P in a CMEC WTRU and an EMEC. Such an interface may be used to create, modify, and/or delete a transport identifier. An MEAO may be configured to manage an NFVO over an Mv1 interface and may regulate the deployment of applications in a CMEC-VE.

The Mp1P function described herein may expose an interface such as an Mp1 interface in a CMEC device to be used by CMEC apps on the CMEC device. The Mp1P function may maintain a mapping of CMEC apps to Mp1 interface identifiers. On the EMEC side, an Mp1P may provide an interface to an EMEC platform and the interface may be identified by an identifier. The Mp1P function may trigger setting up or choosing a transport mechanism, for example, from a CMEC WTRU to an EMEC and vice versa. The Mp1P function may create an identifier for the transport (e.g., an end to end transport) and the transport identifier may be a combination of (e.g., include) multiple (e.g., all) interface identifiers. From a CMEC application's point of view, the transport identifier may allow an MP1 operation to reach a desired EMEC platform. The Mp1P function may update, modify, and/or delete a transport identifier.

A CMEC VE may include a resource repository and may hold information, for example, about available, reserved, and/or allocated virtual resources. The resources repository may play a role in supporting an NFVO's resource orchestration and/or governance, for example, by allowing CMEC-VE reserved or allocated resources to be tracked against one or more VNF instances (e.g., such as a CMEC app and/or an Mp1P) associated with the resources. The CMEC-VE resources may include computation, storage (e.g., memory), networking, and/or hypervisor resources. The CMEC-VE may provide necessary connectivity services using virtual links and/or connection points.

Orchestration of CMEC WTRUs, CMEC apps, and/or EMECs may be provided. An EMEC may act as an MEC host, an MEAO may be used for orchestration and management, and a CMEC WTRU may be a resource constrained device, for example, without an MEC platform and/or MEC capabilities. An NFV reference architecture may be used to configure, deploy, and/or managed CMEC WTRUs, even though the CMEC WTRUs may also be configured and operated using other reference architectures and technologies.

On the EMEC side, an MEAO may be responsible for deploying MEC applications, for example, in the EMEC. The MEAO may provide (e.g., over an Mm3 and/or Mm5 interface) MEC information including, for example, information about CMEC WTRUs and/or how to reach a Mp1P service.

On the CMEC side, an NFVO may be configured to deploy CMEC applications in a CMEC VE. The CMEC applications may be provided with an Mp1 entry point, for example, by the NFVO. A CMEC application package descriptor (e.g., with Mp1 information) may be provided, for example, as described herein. An NFVO may be responsible for deploying an Mp1P, for example, as a VNF in the CMEC VE. The NFVO may configure the Mp1P with information (e.g., via a Ve-vnfm-vnf interface) about how to reach an Mp1 support function in EMEC.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU), comprising:
a processor configured to:
receive a request from an application to join a multi-access edge computing (MEC) service, wherein the application is associated with the WTRU;
send a message to a network device associated with the MEC service, wherein the message indicates the request by the application to join the MEC service;
receive an acknowledgment from the network device, wherein the acknowledgment includes an identifier to be used by the application for the MEC service; and
send a message to the application, wherein the message to the application comprises the identifier to be used by the application for the MEC service and indicates that the application is to use the MEC service via an interface of the WTRU.

2. The WTRU of claim 1, wherein the identifier to be used for the MEC service includes a transport identifier (ID) associated with the MEC service.

3. The WTRU of claim 1, wherein the request from the application is a first request from the application, wherein the message to the application is a first message to the application, and wherein the processor is further configured to:
receive, via the interface, a second request from the application to discover a set of applications using the MEC service;
send, via the interface, the second request from the application to the network device;
receive, via the interface, an indication of the set of applications using the MEC service; and
send, via the interface, a second message to the application, wherein the second message to the application comprises the set of applications using the MEC service.

4. The WTRU of claim 1, wherein the message sent to the network device indicates at least one of an identifier of the WTRU, an identifier of the application, or a location of the WTRU.

5. The WTRU of claim 1, wherein the acknowledgment received from the network device further includes a uniform resource identifier (URI) associated with the MEC service, and wherein the processor is further configured to associate the URI with the application.

6. The WTRU of claim 5, wherein the processor is further configured to receive an application programming interface (API) call from the application and send the API call to the network device based on the URI.

7. The WTRU of claim 1, wherein the processor is further configured to receive an indication from the application to stop participating in the MEC service and send a de-registration request associated with the application to the network device.

8. The WTRU of claim 1, wherein the processor is further configured to send a modification request to the network device regarding the MEC service.

9. The WTRU of claim 8, wherein the processor is configured to send the modification request to the network device based on a mobility event at the WTRU or a load condition of the WTRU.

10. A method implemented by a wireless transmit/receive unit (WTRU), the method comprising:
receiving a request from an application to join a multi-access edge computing (MEC) service, wherein the application is associated with the WTRU;
sending a message to a network device associated with the MEC service, wherein the message indicates the request by the application to join the MEC service;
receiving an acknowledgment from the network device, wherein the acknowledgment includes an identifier to be used by the application for the MEC service; and
sending a message to the application, wherein the message to the application comprises the identifier to be used by the application for the MEC service and indicates that the application is to use the MEC service via an interface of the WTRU.

11. The method of claim 10, wherein the identifier to be used for the MEC service includes a transport identifier (ID) associated with the MEC service.

12. The method of claim 10, wherein the request from the application is a first request from the application, wherein the message to the application is a first message to the application, and wherein the method further comprises:
receiving, via the interface, a second request from the application to discover a set of applications using the MEC service;
sending, via the interface, the second request from the application to the network device;
receiving, via the interface, an indication of the set of applications using the MEC service; and
sending, via the interface, a second message to the application, wherein the second message to the application comprises the set of applications using the MEC service.

13. The method of claim 10, wherein the message sent to the network device indicates at least one of an identifier of the WTRU, an identifier of the application, or a location of the WTRU.

14. The method of claim 10, wherein the acknowledgment received from the network device further includes a uniform resource identifier (URI) associated with the MEC service, and wherein the method further comprises associating the URI with the application.

15. The method of claim 14, further comprising receiving an application programming interface (API) call from the application and sending the API call to the network device based on the URI.

16. The method of claim 10, further comprising receiving an indication from the application to stop participating in the MEC service and sending a de-registration request associated with the application to the network device.

17. The method of claim 10, further comprising sending a modification request to the network device regarding the MEC service.

18. The method of claim 17, wherein the modification request is sent to the network device based on a mobility event at the WTRU or a load condition of the WTRU.

19. A network device, comprising:

a processor configured to:

receive a first message from a wireless transmit/receive unit (WTRU), wherein the first message from the WTRU indicates a request by an application to join a multi-access edge computing (MEC) service, wherein the application is associated with the WTRU;

register the application for the MEC service;

send a response to the WTRU, wherein the response to the WTRU includes an identifier to be used by the application for the MEC service; and receive a second message from the WTRU, wherein the second message from the WTRU is associated with the MEC service and indicates the identifier.

20. The network device of claim 19, wherein the response sent to the WTRU further includes a uniform resource identifier (URI) associated with the MEC service and an indication that the WTRU is to use the URI for the second message.

* * * * *